US008065424B2

(12) United States Patent
Foresti et al.

(10) Patent No.: US 8,065,424 B2
(45) Date of Patent: Nov. 22, 2011

(54) SYSTEM AND METHOD FOR DATA TRANSPORT

(75) Inventors: Stefano Foresti, Salt Lake City, UT (US); William Luke Stebbing, Manti, UT (US); Paolo Lamponi, Provo, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1001 days.

(21) Appl. No.: 11/457,410

(22) Filed: Jul. 13, 2006

(65) Prior Publication Data

US 2007/0016613 A1 Jan. 18, 2007

Related U.S. Application Data

(60) Provisional application No. 60/699,480, filed on Jul. 15, 2005.

(51) Int. Cl.
*G06F 15/16* (2006.01)
(52) U.S. Cl. ....... 709/229; 709/206; 709/225; 340/7.22; 380/242; 726/26
(58) Field of Classification Search ................... 709/229
See application file for complete search history.

(56) References Cited

U.S. PATENT DOCUMENTS

| | | | | |
|---|---|---|---|---|
| 5,781,901 | A * | 7/1998 | Kuzma | 707/10 |
| 5,999,932 | A * | 12/1999 | Paul | 1/1 |
| 6,052,709 | A * | 4/2000 | Paul | 709/202 |
| 7,073,129 | B1 * | 7/2006 | Robarts et al. | 715/740 |
| 7,222,228 | B1 * | 5/2007 | Stephens et al. | 713/1 |
| 7,257,564 | B2 * | 8/2007 | Loughmiller et al. | 706/16 |
| 7,529,940 | B1 * | 5/2009 | Winkel et al. | 713/170 |
| 2001/0034771 | A1 * | 10/2001 | Hutsch et al. | 709/217 |
| 2001/0054073 | A1 * | 12/2001 | Ruppert et al. | 709/206 |
| 2002/0016818 | A1 * | 2/2002 | Kirani et al. | 709/203 |
| 2002/0073236 | A1 | 6/2002 | Helgeson et al. | |
| 2004/0215696 | A1 | 10/2004 | Fisher et al. | |
| 2005/0060372 | A1 * | 3/2005 | DeBettencourt et al. | 709/206 |
| 2005/0102348 | A1 | 5/2005 | Parsons et al. | |
| 2005/0239447 | A1 * | 10/2005 | Holzman et al. | 455/414.3 |
| 2007/0124383 | A1 * | 5/2007 | Hebert et al. | 709/206 |
| 2009/0222450 | A1 * | 9/2009 | Zigelman | 707/10 |

OTHER PUBLICATIONS

PCT International Search Report and Written Opinion, PCT/US06/27383, Mar. 7, 2008, 10 pages.

* cited by examiner

*Primary Examiner* — Thuha T. Nguyen
*Assistant Examiner* — Arvin Eskandarnia
(74) *Attorney, Agent, or Firm* — Patent Law Works LLP

(57) ABSTRACT

An integrated mail and file transfer (IMFT) system is a web-based data transport system including automatic and authenticated access mechanisms. The integrated mail and file transfer system includes an attachment filter, a message & file control server and data storage. The attachment filter receives emails, and for each email generates a metadata file and one or more content files. The metadata and content files are provided to the message & file control server for storage, indexing and further processing. The message & file control server includes a control module, an account creation module, a user interface module, an access control module, an attachment processing module, and a file store and database interaction module. These modules operate on the message & file control server to provide the functionality for automatically creating user accounts, automatically providing access to file, and automatically storing files and emails. The present invention also includes a number of novel methods including: a method for automatically creating an account and authentication, a method for accessing files via a web based transport system, a method for modifying the access to files, and method for processing emails and storing email bodies and attachments.

32 Claims, 23 Drawing Sheets logged in as: oscar.out@gmail.com

*ofc*
File Downloads
List Files
Send Email
Set Key
Log Out

Now sorting by upload time — 1220

Split View  Unified View

Files For Download

| File Name | Uploader | Upload Time | Size |
|---|---|---|---|
| demo_file_1.txt | irene_in@chpc.utah.edu | 2005/06/14 12:45 PM | 1 KB |
| Worksheet.xls | irene_in@chpc.utah.edu | 2005/06/10 12:32 PM | 12 KB |
| demo_file_2.doc | irene_in@chpc.utah.edu | 2005/06/10 11:32 AM | 11 KB |
| demo_file_2.doc | irene_in@chpc.utah.edu | 2005/06/07 2:29 PM | 11 KB |
| demo_file_1.txt | irene_in@chpc.utah.edu | 2005/06/03 11:03 AM | 1 KB |
| 754r.txt | irene_in@chpc.utah.edu | 2005/06/02 4:05 PM | 59 KB |
| ut.sab.bkb.sqh.041605.ppt | irene_in@chpc.utah.edu | 2005/05/16 1:16 PM | 328 KB |
| test_file_2.txt | irene_in@chpc.utah.edu | 2005/05/06 12:03 PM | 1 KB |

My Uploads — 1222

| File Name | Downloaders | Upload Time | Size |
|---|---|---|---|
| Worksheet.xls | pending | 2005/06/14 11:10 PM | 12 KB |
| demo_file_2.doc | otto_out@hotmail... | 2005/06/14 12:51 PM | 11 KB |
| demo_file_2.doc | otto_out@hotmail... | 2005/06/10 12:36 PM | 11 KB |

SYSTEM AND METHOD FOR DATA TRANSPORT

REFERENCE TO RELATED APPLICATION

The present application claims priority under 35 U.S.C. §119(e) to U.S. Provisional Patent Application No. 60/699,480, filed on Jul. 15, 2005, entitled "SYSTEM AND METHOD FOR DATA TRANSPORT" which is incorporated by reference in its entirety.

BACKGROUND OF THE INVENTION

1. Field of the Invention

The present invention relates to systems and methods for sending and receiving files. In particular, the present invention relates to systems and methods for sending and receiving both electronic mails (emails) and files, and providing an integrated user interface for accessing email and files.

2. Description of the Background Art

Email and the web have flourished in the last decade and reached almost a billion users worldwide. In fact, these technologies have become a primary communication channel for many people. Over the last few years, email and web have substituted for regular mail as the official channel for many business, financial, and government communications and transactions. Even though email and the web have been widely used, these aging technologies have a number of limitations and problems. In particular, there are several problems with current email and web systems.

One problem in current email and web systems is the existence of multiple accounts and passwords. The creation of a web account, whether for a personal or corporate account, involves the definition of username, password and properties meant to identify the user. The result is that people end up with an unbounded list of usernames and passwords that are time consuming to manage, hard to remember, and cannot be recorded. Every computer or internet user knows that to have accounts on multiple systems and services, user must: have multiple different login names; be subject to different password rules; change passwords often according to system requirements, and not record or share a password. These restrictions coupled with multiple accounts results in additional problems including difficulty in remembering usernames and passwords, coping with repetitive, lengthy, and sometimes buggy account creation forms, dealing with complicated or lengthy password re-requests or re-activations, requirements for expensive system administration and security staff, and evaded or ineffective security when users are frustrated with security systems.

Another problem with email systems is the attachments used within the email systems. Most internet users and business services commonly attach files to emails, or create very large HTML messages. The attachments may result in email sizes that are orders of magnitude larger than a text email message. Email technology was originally intended only for short text messages. Attachments were not originally intended in the design of email systems and cause the problems because email servers have a low byte size limit compared to the file sizes that people today consider normal to communicate, each email server has different limitations on email and attachment sizes, and users' email boxes (POP) have limited storage capacity that can be exceeded by incoming messages.

As a result, emails may be bounced back to senders. In addition, the senders may not know whether a message is receivable at a destination email address before the email is actually sent making email unreliable for sending attachments. Some of the problems experienced by email users due to mailbox sizes and similar email limitations, include: unpredictable time to retrieve emails on slow connections, email bounces back (both at receiving and sending server), cluttered email client files that become corrupted, and replication of files between the PC file system and the email system. Furthermore, there are problems experienced by ISPs and corporations handling emails such as mail servers processing large emails that the users may not read, large emails bounce back and double file transfer costs, and missed communications occur and cause inefficiency and potential lost business.

File transfers of information across the web also include a number of problems. Some of the problems relate to web file uploading, links, and permissions. The web is an ideal place to post information, whether in the form or web pages or files. However, it continues to be very difficult to use personal web sites to do simple things like publishing information, notifying desired recipients, and providing them with web links.

While accessing attachments from a web site may be relatively easy, the process to setup restricted access on a personal web space is cumbersome and complicated, and beyond the ability of most users. First, the user must control the web space from which the attachments are downloadable. Second, the user must often do the following: manually upload the file to a web space, identify the correct URL for the file, copy the URL for the file into an email, set up a restricted web directory (.htaccess), place the files to be transferred in the web directory, create a password, and provide the password to the recipient. In addition, users do not have an easy way to upload files that are restricted to a user determined list of people. Portal accounts enable users to create directories to be shared with a list of other people. However, the restricted file sharing is done by directory of files and groups of people. The recipients generally need to have or create an account on that service (for instance, Yahoo Briefcase). Therefore, users who want to determine a limited list of people that can access a file on the web need to: make sure that the intended people have an account on the storage system, set up the list as a group of account IDs, set up a directory accessible to the group, and place a file in such directory. All of this is enormously cumbersome and limitative, and hinders people from sharing files. In other words, it is hard for an expert user to set file permissions for a selected list of people, and virtually impossible for the layman user.

Another problem related to web transfers of data is restrictive corporate intranets. Corporations have invested significantly over the last decade to deploy corporate intranets and file servers within the company's firewalls. This has been useful to define the boundaries of corporate information and sharing. However, employees normally have to communicate with external entities: therefore, corporations had to develop more costly features to enable restricted access and functionality to external customers and suppliers. In addition, corporate intranets need system administrators to enact special access requirements determined by employees' business and communication needs. This has resulted in additional IT development cost for low benefit. Technological constraints have been placed before business constraints, while complicating and slowing down information flow.

Because corporate intranets place a layer of system administration between people and information, employees avoid the boundaries of corporate intranets or email systems and often use other mechanisms for communication such as using email to exchange files that the intranet would disallow, using personal email accounts to conduct corporation business, using external free web file spaces (Xdrive, Yahoo, etc.), and using USB or flash memory cards to transfer files from laptop to laptop, thus evading any predefined control on file systems. The result of this flawed conception and implementation of corporate IT is that businesses deploy very costly intranet infrastructure and operations in the name of security, but this produces a work force that constantly evades the system because they cannot get certain jobs done.

Therefore, what is needed is a system and methods for an integrated mail and file transfer system.

SUMMARY OF THE INVENTION

The present invention overcomes the deficiencies and limitations of the prior art by providing an integrated mail and file transfer (IMFT) system. The IMFT system is a web-based data transport system including automatic and authenticated access mechanisms. In one embodiment, the integrated mail and file transfer system includes an attachment filter, a message & file control server and data storage. The attachment filter includes or is adapted to work with a conventional email server. The attachment filter receives emails, and for each email generates a metadata file and one or more content files. The metadata and content files are provided to the message & file control server for storage, indexing and further processing. The message & file control server is coupled to a conventional web server, the email server, the attachment filter and the data storage. In one embodiment, the message & file control server includes a control module, an account creation module, a user interface module, an access control module, an attachment processing module, and a file store and database interaction module. These modules operate on the message & file control server to provide the functionality for automatically creating user accounts, automatically providing access to file, and automatically storing files and emails.

The present invention also includes a number of novel methods including: a method for automatically creating an account and authentication, a method for accessing files via a web based transport system, a method for modifying the access to files, and method for processing emails and storing email bodies and attachments.

BRIEF DESCRIPTION OF THE DRAWINGS

The invention is illustrated by way of example, and not by way of limitation in the figures of the accompanying drawings in which like reference numerals are used to refer to similar elements.

FIGS. 12A-12D are exemplary graphical representations of a display device showing interfaces processing email with the IMFT system in accordance with the present invention.

DETAILED DESCRIPTION OF THE PREFERRED EMBODIMENTS

Figure 1:
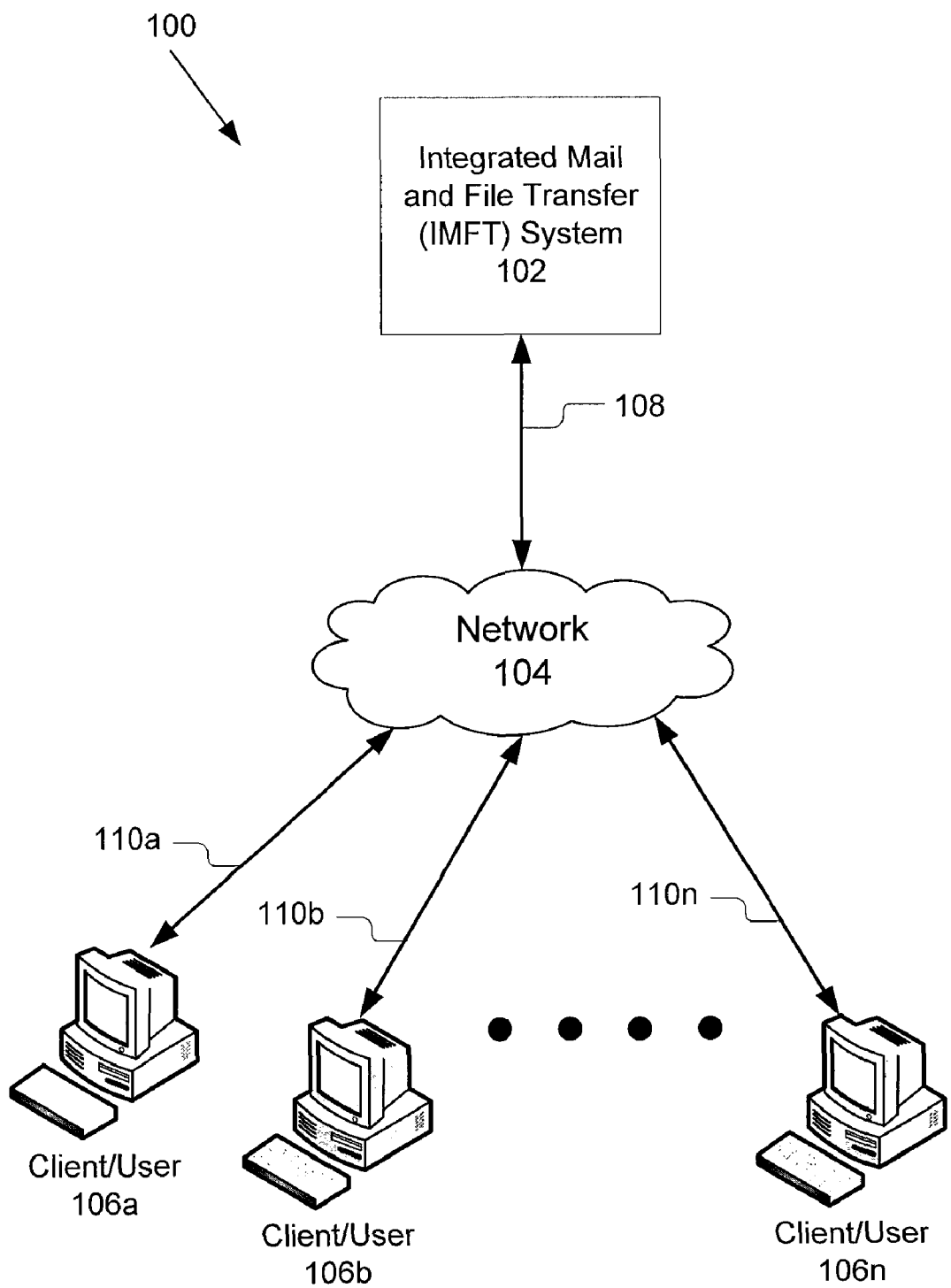
FIG. 1 is a block diagram of an embodiment of the data transport system of the present invention.

A system and methods for integrated mail and file transfer (IMFT) are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to email addresses as unique identifiers. However, the present invention applies to any type of identifier specific to a communication channel such as a telephone number, a user name or other identification number.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system or network. For example, the invention can operate on a local area network, an intranet, or the Internet depending on the configuration. Thus, the present invention is capable of operating with any information system from those with minimal functionality to those providing all the functionality disclosed herein.

System Overview

Referring now to FIG. 1, an embodiment of the data transport system 100 of the present invention is shown. In this embodiment, the system 100 comprises: an integrated mail and file transfer (IMFT) system 102, a network 104, and a plurality of client devices 106a-n. As can be seen from FIG. 1, a particular advantage of the IMFT system 102 of the present invention is that it requires no changes to the existing IT infrastructure. Users do not have to learn new applications or new technologies, they send their email messages and attachments using the same email clients, or with new intuitive web interfaces provided by the IMFT system 102. The IMFT system 102 filters the attachments and stores them persistently as documents on cheaper file server storage instead of high-performance, expensive email storage. Attachments and the body of the email message are replaced by links in the email message. The IMFT system 102 controls messaging and the exchange of documents. Ownership and access control are determined by the globally unique email addresses of the sender and of the recipient(s). The time stamp of each document (i.e., attachment), once assigned, cannot be changed. The documents can then be retrieved at the recipient's end by clicking on the links embedded in the email message and downloading the file securely.

The present invention is directed to a device, the IMFT system 102, capable of providing an integrated or converged paradigm for the user to send and receive emails, and send and receive files. The IMFT system 102 includes a message & file control server 202, data storage 204 and an attachment filter 206. The IMFT system 102 also includes a conventional web server 208 and an email server 210. The IMFT system 102 is a device for processing emails and files, and making them accessible via the web server 208. The IMFT system 102 is coupled by signal line 108 to the network 104 for communication and interaction with other devices. The IMFT system 102 is described in more detail below with reference to FIGS. 2 and 3. The IMFT system 102 includes the ability to filter and store the attachments, to control messaging and exchange of documents, to automatically create accounts and authenticate users, and to control access to documents.

The network 104 is preferably of a conventional type for interconnecting computing devices. The network 104 can be any one of a conventional type such as a local area network (LAN), a wide area network (WAN) or any other interconnected data path across which multiple computing devices may communicate.

One or more client devices 106a-n are coupled to the network 104 by signal lines 110a-n, respectively, for communication with the IMFT system 102, and other devices (not shown). The client devices 106a-n include conventional client processing capabilities, such as web browser for interaction with the IMFT system 102. The client devices 106a-n are adapted to enable communication with the IMFT system 102 so that the original files can be transferred between the IMFT system 102 and the client devices 106a-n as requested. The client devices 106a-n can be personal computers, cellular telephones, pagers, personal digital assistants, or the like.

The present invention includes a number of novel features including passwordless accounts, automatic account generation, access control, and attachment filtering which are briefly summarized here, but will be described in more detail with reference to the flowcharts.

In one embodiment, the IMFT system 102 uses an email address or other messaging address as a unique ID. Account access is provided with a key or verification sent to the provided email address or messaging address. In other words, an electronic transport protocol is provided with a "passwordless" authentication scheme. As will be described in more detail below with reference to FIG. 6A-6E, the IMFT system 102 works as follows: a user provides an email address or messaging address; the user requests an entry key; the key is sent to the email address provided; the user receives the email with a link; clicking the link provides an authenticated entry in the system. Moreover, an account can be assigned based on providing a valid identification, such as an email address or an instant messaging address, thus eliminating the need for the creation of a username as well. The same authentication method can be extended to other unique IDs and related transport mechanisms such as instant messaging (IM ID+IM message containing web link); government issued ID (ID+ postal message containing web link); SMS (Short Message Service for Wireless Phones); home (number+voice mail or SMS containing web link), etc. As a result, the IMFT system 102 provides an electronic service whereby any individual in possession of a valid and acceptable ID can validate into a system (without a previously issued password or key), by requesting a link or key to access the system, sent to the address associated to the ID.

In addition, the validation to the IMFT system 102 using the defined ID can automatically setup a web account for the user without the typical account setup and form filling procedures. In other words, a "Setupless account" is created for the end user. This means that an account separate from the ID account is not set up for individual access to the system. Technically, an account is set up, but it happens automatically. What makes it "Setupless" is that this happens transparently to the end user; and it is not necessary for the user to select a username and password before getting started. The IMFT system 102 allows a valid ID to be used in order to grant access files and to an account on the IMFT system 102. The present system and method does not require the setup of an account that needs an independent login name and password. Account access can be provided with the authentication process described above using only a (ID or related address+related transport). The IMFT system 102 allows any individual in possession of a valid ID to be immediately granted an account. The individual is authenticated into the individual account with a key sent to the related address provided to the ID granting agency and the user can immediately access the account with the key received.

The access to files and data using web transport protocols currently uses the file permission method described above. Current file and data access control for information systems is provided at the system level. In addition, file permissions are based on account usernames. Permissions are based on IDs, not accounts. Access is dynamically granted to an account based on the IDs that have been associated with it (through consolidation). In one embodiment, the IMFT system 102 uses a token formed by encoding a hash key in the URL representing the list of IDs that are permitted to access such a file. The purpose of tokens is to provide authentication (like a password embedded in a link), not to control access. Tokens indicate who you are and how you proved it. The method of proof used can affect what you are potentially allowed to do, independent of what access controls have actually been set. In general, three things affect whether an action is allowed: first, how convincing the proof of identity was; second, the conveyed intentions of the controllers of the resources in question; and third, the conveyed intentions of the controllers of the information in question. The first corresponds to action-restricted tokens, the second corresponds to insider/outsider rules; and the third corresponds to access controls in the classic sense. The IMFT system 102 allows users to determine a set of people, in the form of a list of email addresses, which can download such file. This process is described in more detail below with reference to FIG. 8A. This allows an individual in possession of a file to determine a list of email addresses that identify the only authorized individuals to access such a file.

The present embodiment is a way for a user to grant limited and specific authorization for the use of a system that consumes storage and data communication resources, and hence that user is presumably paying for or subsidizing the storage system. Specific features of the present system may include permissions at object level (file), based on an ID (including email addresses); inheritance of permissions; and enabling permitted users to grant further permissions. In one embodiment, a patronization system is included for specifying an authorized message ID holder for a system's transaction and the message ID holder or user is sent en email containing a link to authorize the transaction. This link allows the user to either download or view information that is protected by a data server or web server. In addition, the IMFT system 102 includes a proactive authorization of a transaction on behalf of a certain ID.

Additional safeguards to control what a user can do with the link may also be provided. For instance, the IMFT system 102 can require further authentication to access a link, require further authentication after a defined amount of time has passed (e.g., days) or the link can be made to expire.

The IMFT system 102 includes an attachment filter 206 for decomposing emails into components and creating modified emails without attachments. The attachment filter 206 processes an email from a sender and determines the content components of the email message (such as a file attachment or HTML data, and message body). Then the attachment filter 206 replaces such components (attachments and message body) with links that make the components accessible as files through the web server 208. In particular, the file can be saved in the IMFT system 102 with a hash link. Then the email being sent to the recipient for accessing the file will have the component replaced by the link. Components of an email message that can be selected and replaced with a link to a file include file attachments, HTML formatted message's file components, images or other files that are linked in the HTML content, and any other subset of the email message body. The sender of the email can also include an encrypted text link. This is done by allowing a message sender to specify selected text in an email to be encrypted. This selection can be done by using special text markers or by a graphical interface selection. Such selected text is then encrypted by the IMFT system 102 and placed in an encrypted file. The encrypted file can then be saved in the IMFT system 102 with a hash link. The email being sent has the to-be-encrypted text replaced with the link. Then the encrypted information can be accessed using the hash link and a secure web data link. An example of a secure web data link is SSL (Secure Socket Layer). Using SSL (HTTPS) for the link guarantees that whoever clicks the link will have a secure session, since anyone trying to snoop the connection would need the server's private key that matched its public certificate. It should be understood to those skilled in the art that 1) once the session is initiated, it cannot be snooped; 2) the session can be initiated by anyone who can read the email, however their IP address will be is logged by the system, and it will be viewable by the sender; and 3) sending a link is more secure than sending the text, because once the information in the text is out there, it's out there, and it can be intercepted based on keywords, but the link is generic and can be changed to require further authentication at any later time if so desired.

Integrated Mail and File Transfer (IMFT) System 102

Figure 2:
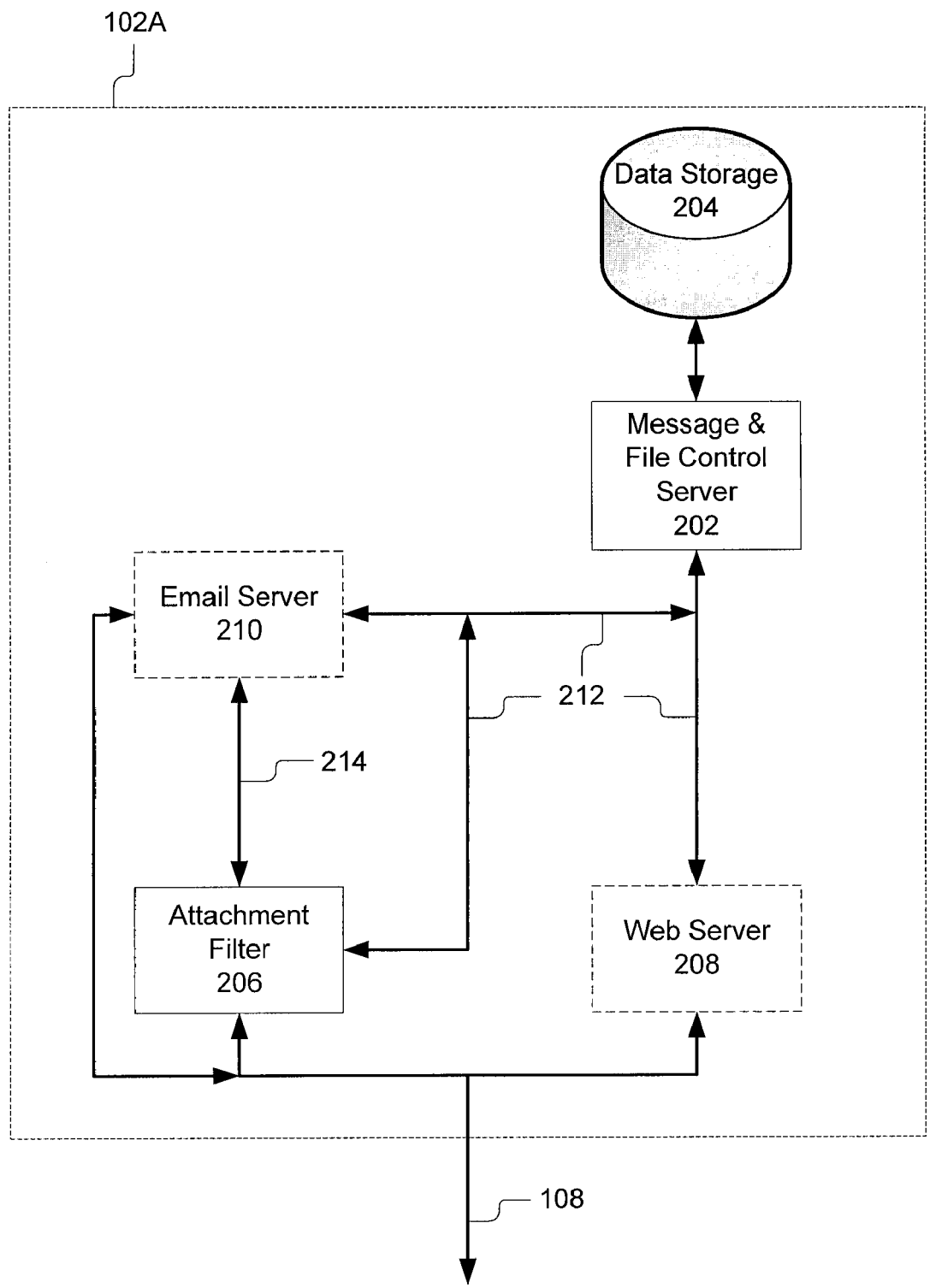
FIG. 2 is a block diagram of a first embodiment of an integrated mail and file transfer (IMFT) system according to the present invention.

Referring now to FIG. 2, a block diagram of a first embodiment of the IMFT system 102A according to the present invention is shown in more detail. The IMFT system 102A comprises the message & file control server 202, the data storage 204, the attachment filter 206, a web server 208 and an email server 210. Although shown in block diagram form, those skilled in the art will recognize that these components may be integrated into a single device.

The message & file control server 202 is an apparatus for sending emails and sending documents to other devices; for storing uploaded files, and metadata files and content files generated from original emails; for generating user interfaces for accessing and interacting with the IMFT system 102A; and for controlling access to the IMFT system 102A. The message & file control server 202 includes a number of modules for performing these functions as will be described below in more detail with reference to FIGS. 4 and 5. The message & file control server 202 is coupled for communication and interaction with the data storage 204. The message & file control server 202 has inputs and output coupled to bus 212 to communicate with the attachment filter 206, the web server 208 and the email server 210. The message & file control server 202 is coupled to the attachment filter 206 to receive metadata files and content files generated from original emails by the attachment filter 206. The message & file control server 202 is coupled to the web server 208 to receive data input by users via web pages, provide web pages for presentation to the user, to receive files uploaded from the client devices 106a-n, and to download files to the client devices 106a-n. The message & file control server 202 is coupled to the email server 210 to send modified email messages. The message & file control server 202 is hardware capable of executing and performing routines to achieve the functionality described below with reference to FIGS. 6A, 7A, 8A and 11.

The data storage 204 is a device such as a hard disk drive, disk array or other non-volatile storage media. The data storage 204 is shown as being coupled to the message & file control server 202 in this embodiment. The data storage 204 is used to store content files, metadata files, an index, tokens and web pages.

The attachment filter 206 has an input and outputs for removing attachments from emails. In one embodiment, the attachment filter 206 strips the attachments including the emails message body, and stores them as separate files persistently on cheaper file server storage instead of high-performance, expensive email storage. The attachment filter 206 is coupled to the network 104 by signal line 108, and to the email server 210 by signal line 214. The functionality of the attachment filter 206 will be described in more detail below with reference to FIGS. 3, 9A, 9B and 10. The attachment filter 206 is hardware capable of executing and performing routines to achieve the functionality described below FIGS. 9A and 9B.

The web server 208 is one of a conventional type and is a computer that is responsible for accepting HTTP requests from clients, which are known as Web browsers, and serving them Web pages, which are usually HTML documents and linked objects (images, etc.). The web server 208 is coupled to the network 104 by signal line 108, and coupled to the bus 212 for communication with the message & file control server 202.

The email server 210 is one of a conventional type and is for example a server running a Mail transfer agent (MTA) or system of MTAs used to route email and act as a mail server, by storing email and supporting client access (MUA) using Post Office Protocol (POP), Internet Message Access Protocol (IMAP) or other protocols. The email server 210 is coupled to the network 104 by signal line 108, and coupled to the bus 212 for communication with the message & file control server 202.

Figure 3:
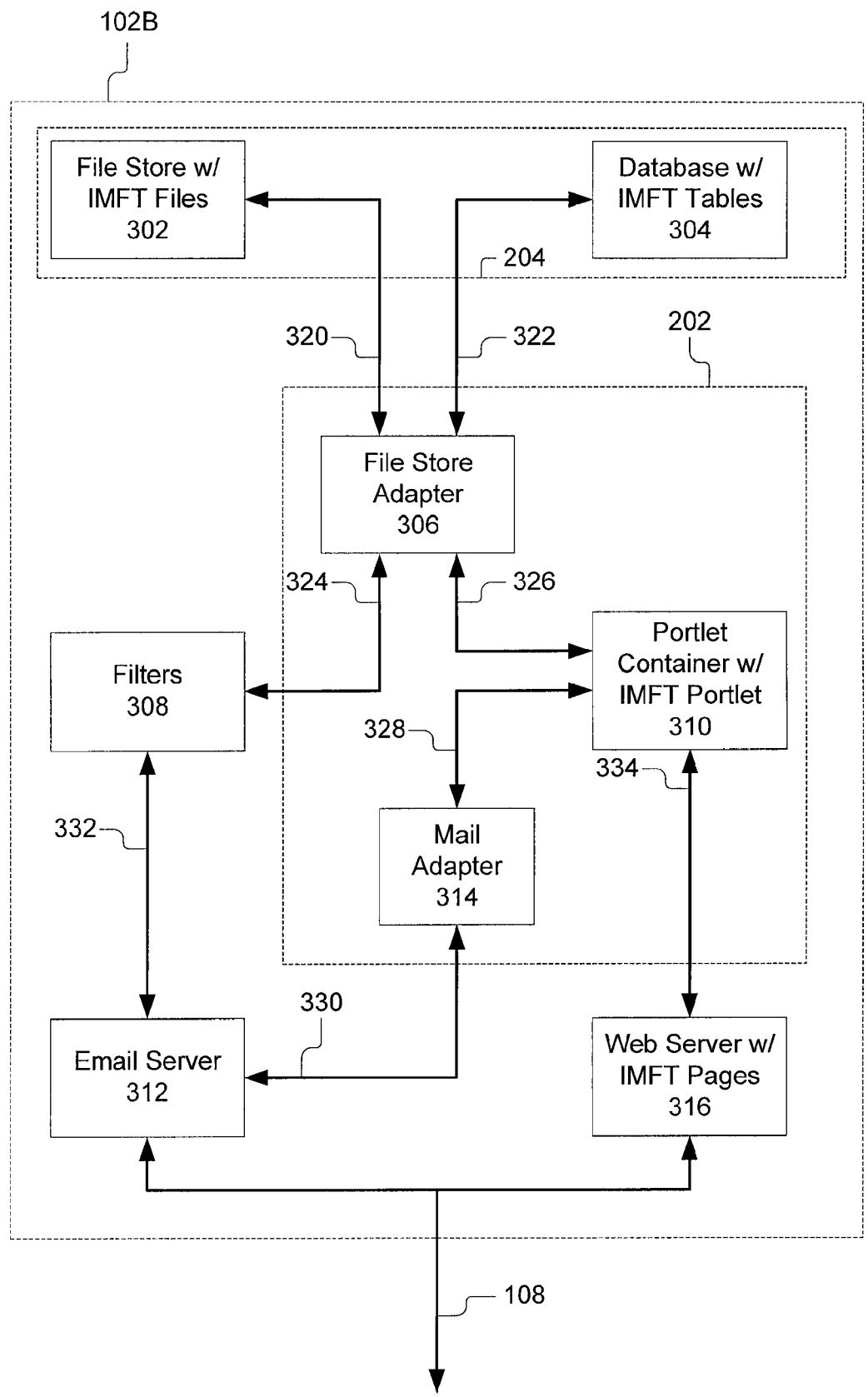
FIG. 3 is a block diagram of a second embodiment of the integrated mail and file transfer unit according to the present invention.

Referring now to FIG. 3, a block diagram of a second embodiment of the IMFT system 102B according to the present invention is shown in more detail. In this embodiment, the IMFT system 102B comprises a file store 302 with IMFT files, a database 304 with IMFT tables, a file store adapter 306, filters 308, a portlet container 310 with at least one IMFT portlet, an email server 312, a mail adapter 314, and a web server 316 with IMFT pages. As can be seen, the file store 302 and the database 304 collectively are the data storage 204, and the file store adapter 306, the mail adapter 314 and the portlet container 310 are collectively part of the message & file control server 202. The present invention advantageously provides a way for users to interact with their files in a web browser using the web server 316 and email server 312.

As noted above for web server 208, the web server 316 is similarly a conventional type. The web server 316 includes IMFT pages. The IMFT pages provide the web-based user interface, send user actions directly to the portlet container 310, and render portlet responses. The web server 316 is coupled by signal line 108 to the network 104 and by signal line 334 to the portlet container 310.

The email server 312 is similarly a conventional type, and is similar to the email server 210 described above. The email server 312 is coupled by signal line 108 to the network 104 and by signal line 332 to the filter 308.

The portlet container 310 includes at least one IMFT portlet. The IMFT portlet is the portlet backend responsible for controlling work flow, and translating user actions into requests for the file store adapter 306 and the mail adapter 314 to perform the necessary functions. The portlet container 310 is coupled by signal line 334 to the web server 316, and by signal lines 326 and 328, respectively, to the file store adapter 306 and the mail adapter 314.

The mail adapter 314 is coupled to the portlet container 310 by signal line 328 and to the email server 312 by signal line 330. The mail adapter 314 controls the transmission of modified emails by the email server 312. When requested, the mail adapter 314 signals the mail server 312 to send emails on behalf of the user. These emails are modified to contain links that point to the file store 302 and will perform the requested file actions (such as downloading a file or viewing a file folder) when clicked by any recipient.

The file store 302 stores IMFT files and provides an interface, for example WebDAV, to all files stored in the IMFT system 102B. The WebDAV is an open standard that allows many types of applications to use the file system if they have the necessary permissions. In particular, IMFT Portlet has these permissions. The file store 302 is coupled to the file store adapter 306 by signal line 320, and sends and receives files and commands.

The file store adapter 306 controls the access to the database 304 and the file store 302. The file store adapter 306 takes requests, for example in WebDAV, and translates them into actions on the file store 302 (which contains the IMFT files), and the database 304 (which stores file properties, such as permissions, in IMFT tables). The file store adapter 306 also communicates with filters 308 (attachment filtering software, system virus scanning software, and spam filtering software) in order to block unwanted or dangerous files. The file store adapter 306 is coupled to the database 304 by signal line 322.

The filters 308 are similar to the attachment filter 206 described above. In one embodiment, the IMFT attachment filter 308 plugs into the mail server 312 or server cluster, and uses the mail server's virus scanning hooks in order to strip attachments out of incoming and outgoing emails. The attachments may be removed from the emails and sent to the file store adapter 306. The attachments can be replaced with links that point back to the file store adapter 306. Attachments can be removed based on predefined rules, such as a minimum size that triggers the removal (it may sometimes be unnecessary and even counterproductive to remove attachments of insignificant size). The IMFT attachment filter 308 implements the functionality that is described below with reference to FIGS. 9A, 9B and 10.

Message & File Control Server 202

Figure 4:
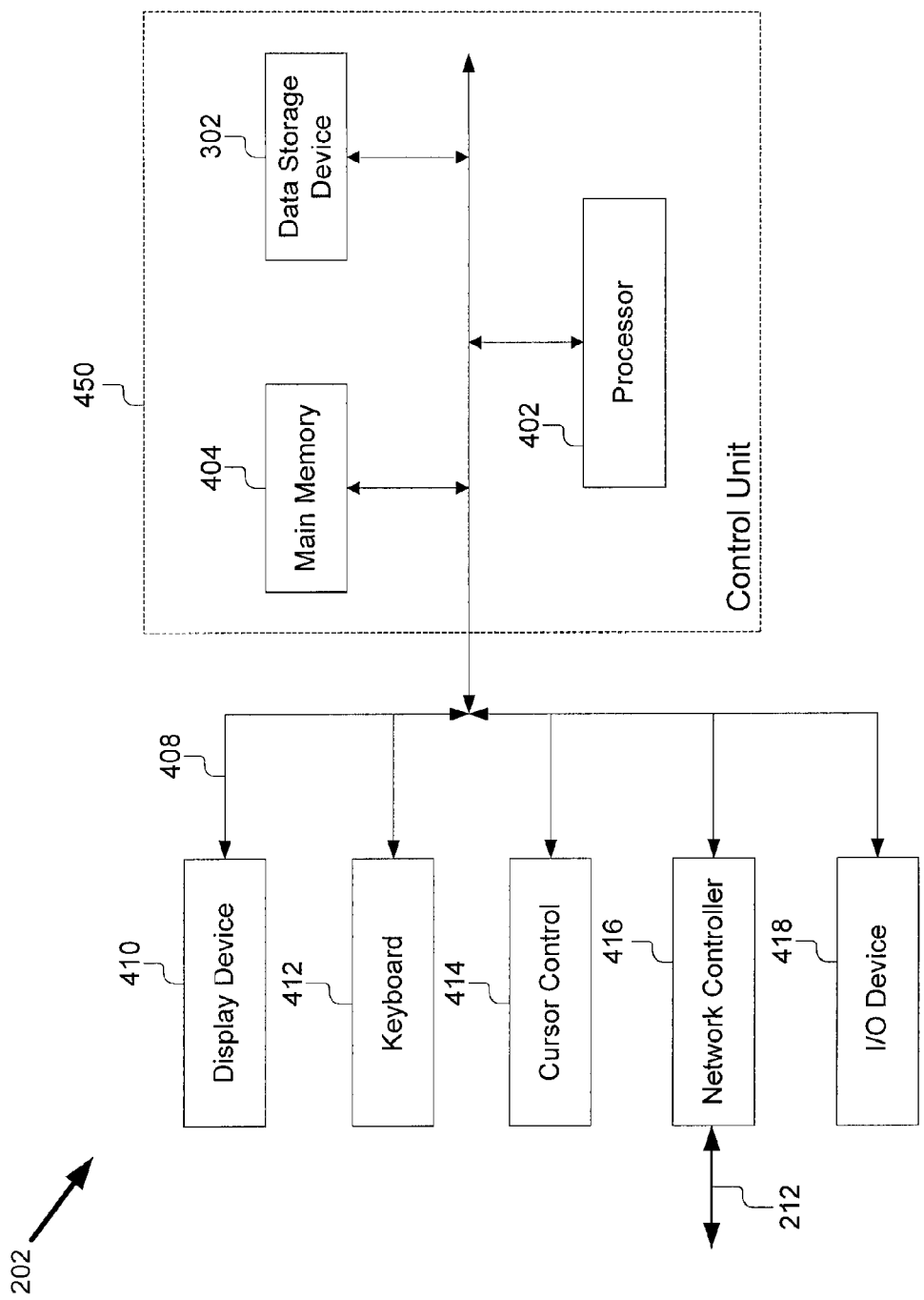
FIG. 4 is a block diagram of one embodiment of a message & file control server in accordance with the present invention.

FIG. 4 is a block diagram of an embodiment of the message & file control server 202 in accordance with the present invention. The message & file control server 202 preferably comprises a control unit 450, a display device 410, a keyboard 412, a cursor control device 414, a network controller 416 and one or more input/output (I/O) device(s) 418.

The control unit 450 comprises an arithmetic logic unit, a microprocessor, a general purpose computer, or some other information appliance equipped to provide electronic display signals to display device 410. In one embodiment, control unit 450 comprises a general purpose computer having a graphical user interface, which may be generated by, for example, a program written in Java running on top of an operating system like WINDOWS® or UNIX® based operating systems. In one embodiment, one or more application programs are executed by control unit 450 including, without limitation, word processing applications, electronic mail applications, financial applications, and web browser applications.

Still referring to FIG. 4, the control unit 450 is shown including processor 402, main memory 404, and data storage device 204/302, all of which are communicatively coupled to system bus 408.

Processor 402 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included.

Main memory 404 stores instructions and/or data that may be executed by processor 402. The instructions and/or data may comprise code for performing any and/or all of the techniques described herein. Main memory 404 may be a dynamic random access memory (DRAM) device, a static random access memory (SRAM) device, or some other memory device known in the art. The memory 404 is described in more detail below with reference to FIG. 5.

Data storage device 302 stores data and instructions for processor 402 and comprises one or more devices including a hard disk drive, a floppy disk drive, a CD-ROM device, a DVD-ROM device, a DVD-RAM device, a DVD-RW device, a flash memory device, or some other mass storage device known in the art. In an alternate embodiment, data storage 302 may be replaced by a connection to remote data storage 204 of the IMFT system 102. Such a connection is made through a bus coupled to a drive controller that accesses other data storage 204 of the IMFT system 102.

System bus 408 represents a shared bus for communicating information and data throughout control unit 450. System bus 408 may represent one or more buses including an industry standard architecture (ISA) bus, a peripheral component interconnect (PCI) bus, a universal serial bus (USB), or some other bus known in the art to provide similar functionality. Additional components coupled to control unit 450 through system bus 408 include the display device 410, the keyboard 412, the cursor control device 414, the network controller 416 and the I/O device(s) 418.

Display device 410 represents any device equipped to display electronic images and data as described herein. Display device 410 may be, for example, a cathode ray tube (CRT), liquid crystal display (LCD), or any other similarly equipped display device, screen, or monitor. In one embodiment, display device 410 is equipped with a touch screen in which a touch-sensitive, transparent panel covers the screen of display device 410.

Keyboard 412 represents an alphanumeric input device coupled to control unit 450 to communicate information and command selections to processor 402. The keyboard 412 can be a QWERTY keyboard, a key pad, or representations of such created on a touch screen.

Cursor control 414 represents a user input device equipped to communicate positional data as well as command selections to processor 402. Cursor control 414 may include a mouse, a trackball, a stylus, a pen, a touch screen, cursor direction keys, or other mechanisms to cause movement of a cursor.

Network controller 416 links control unit 450 to a network 104 that may include multiple processing systems. The network 104 of processing systems may comprise a local area network (LAN), a wide area network (WAN) (e.g., the Internet), and/or any other interconnected data path across which multiple devices may communicate. The control unit 450 also has other conventional connections to other systems such as a network for distribution of files (media objects) using standard network protocols such as TCP/IP, http, https, and SMTP as will be understood to those skilled in the art. The connection of the message & file control server 202 to the web server 208 by signal line 212 is also shown in FIG. 4 as passing through network controller 416. However, those skilled in the art will recognize that the web server 208 and the attachment filter 206 could be coupled to the bus 408 for interaction with the message & file control server 202 in a variety of conventional ways.

One or more I/O devices 418 are coupled to the system bus 408. These I/O devices may be part of other components in one embodiment and in another embodiment are part of the message & file control server 202. For example, the I/O device 418 includes an image scanner for capturing an image of a document for uploading. The I/O device 418 may also include a printer or an audio input/output device equipped to receive audio input via a microphone and transmit audio output via speakers. Optionally, I/O audio device may contain one or more analog-to-digital or digital-to-analog converters, and/or one or more digital signal processors to facilitate audio processing.

It should be apparent to one skilled in the art that message & file control server 202 may include more or less components than those shown in FIG. 4 without departing from the spirit and scope of the present invention. For example, message & file control server 202 may include additional memory, such as, for example, a first or second level cache, or one or more application specific integrated circuits (ASICs). Similarly, additional components input/output devices 418 may be coupled to control unit 450. One or more components could also be eliminated such as cursor control 414.

Figure 5:
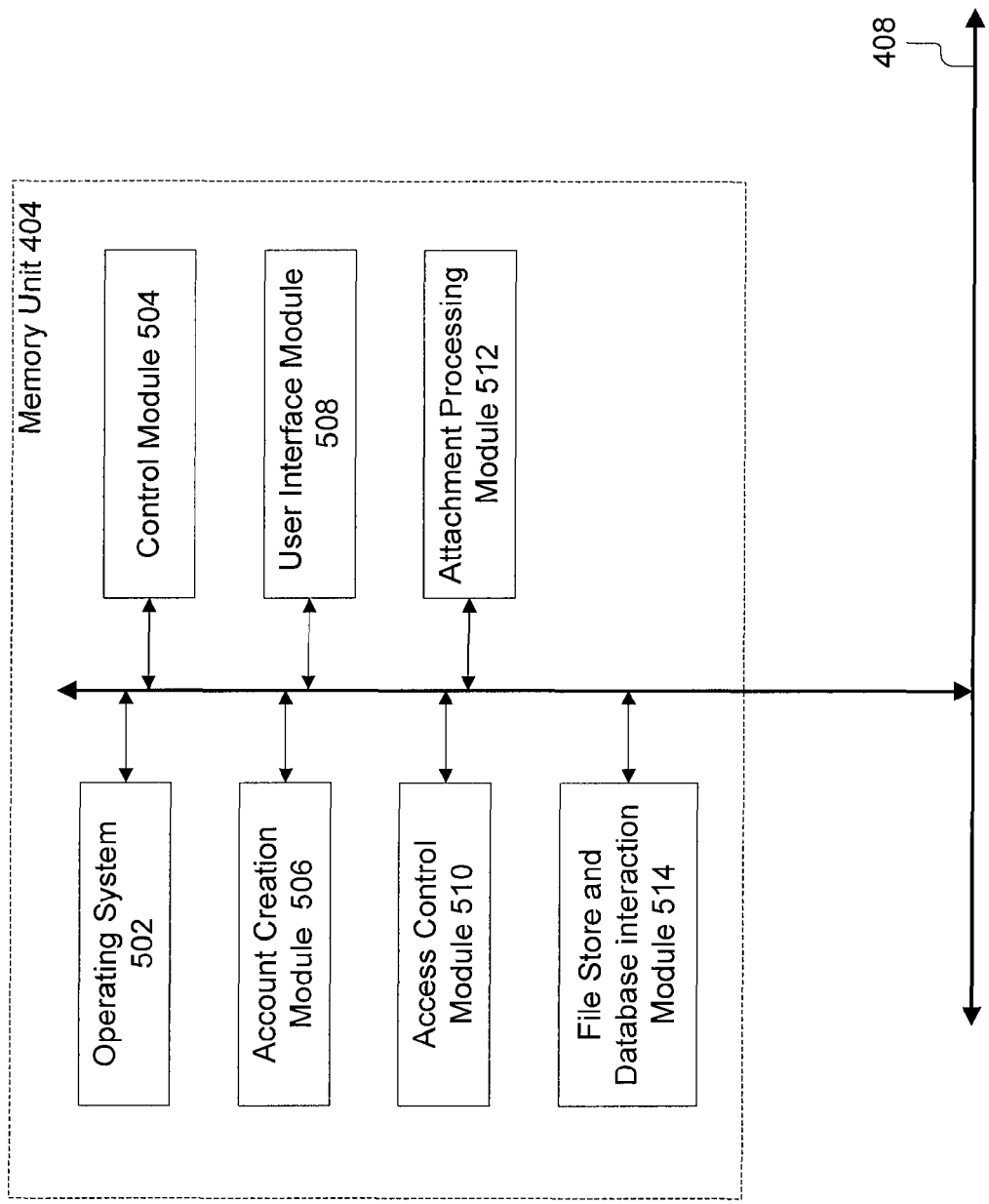
FIG. 5 is a block diagram of one embodiment of the memory for the message & file control server.

FIG. 5 is a block diagram of one embodiment of the memory for the message & file control server 202. The memory 404 for the message & file control server 202 preferably comprises: an operating system 502, a control module 504, an account creation module 506, a user interface module 508, an access control module 510, an attachment processing module 512, and a file store and database interaction module 514. As noted above, the memory unit 404 stores instructions and/or data that may be executed by processor 402. The instructions and/or data comprise code for performing any and/or all of the techniques described herein. These modules 502-514 are coupled by bus 408 to the processor 402 for communication and cooperation to provide the message & file control server 202. Those skilled in the art will recognize that while the present invention will now be described as modules or portions of a memory unit 404 of a computer system, the modules or portions thereof may also be stored in other media such as permanent data storage device 406 and may be distributed across a network 104 having a plurality of different computers such as in a client/server environment.

The operating system 502 is preferably one of a conventional type such as, WINDOWS®, SOLARIS® or LINUX® based operating systems. Although not shown, the memory unit 404 may also include one or more application programs including, without limitation, word processing applications, electronic mail applications, financial applications, and web browser applications.

The control module 504 is used to control the other modules of the memory 404. The control module 504 is adapted for communication with the account creation module 506, the user interface module 508, the access control module 510, the attachment processing module 512, and the file store and database interaction module 514. The operation of the control module 504 will be apparent from the description of FIGS. 6A-12D below. While the control module 504 is shown as a separate module of the memory 404, those skilled in the art will recognize that the control module 504 in another embodiment may be distributed as routines in the other modules 506-514.

The account creation module 506 is used to automatically create new accounts, and provide authentication of users to the IMFT system 102. In one embodiment, the account creation module 506 is software adapted for communication with the user via the user interface module 508, and communication with the file store and database interaction module 514. The creation module 506 automatically generates a user account in the IMFT system 102 in response to providing a unique ID such as an email address. Each user account can be associated with a plurality of unique IDs or email addresses. The account creation module 506 also performs authentication and generates tokens that can be provided to the user for access to files stored in the data storage 204. The operation of the account creation module 506 is described in more detail below with reference to FIGS. 6A-6E.

The user interface module 508 is used to control the interaction with the user. In one embodiment, the user interface module 508 is software adapted for communication or operation upon the web server 208. The user interface module 508 is responsible for serving different web pages to present information to the user and to receive user input and files. The user interface module 508 generates the user interface as depicted in figure is 6B-12D. The user interface module 508 works in conjunction with the other modules, 504, 506, 510, 512 and 514 to present information to the user, to receive information from the user, and to receive and send files the user as will be described below with reference to FIGS. 6A, 7A, 8A and 11.

The access control module 510 is used to modify or set the access controls for files stored in data storage 204. In one embodiment, the access control module 510 is software adapted for communication with the user interface module 508 and the control module 504. In one mode, the access control module 510 automatically sets the access controls for files that are associated with emails being sent out the IMFT system 102. In a second mode, the access control module 510 uses the user interface module 508 to communicate with the user. Based on input provided by the user, the access control module 510 will modify the access control settings for files which the user has uploaded or for which the user has permission to modify the access control settings. The access control module 510 is also responsible for performing the patronage operations of the present invention wherein a user who does not have permission to perform certain operations with regard to a file can generate a request and send it to the owner of the file or another user who has the ability to provide such permissions. With the present invention, the user advantageously need only select the file for patronage, and then the access control module 510 automatically performs the remaining steps, including contact the file owner to either obtain patronage or deny patronage. The operation of the access control module 510 is described in more detail below with reference to FIG. 8A.

The attachment processing module 512 is used to process content associated with emails so they may be replaced with hypertext links in the modify email format. In one embodiment, the attachment processing module 512 is software for processing content and metadata files. The attachment filter 206 decomposes received emails and creates a content file and a metadata file for the message body of the email. Similarly, the attachment filter 206 creates a content file and a metadata file for each attachment to the email. These content files and metadata files are placed by the attachment filter 206 in a temporary storage (not shown). The attachment processing module 512 is responsible for detecting the presence of new content files and metadata files that are placed in the temporary storage. Under the control of control module 504, the attachment processing module 512 works with the file store and database interaction module 514 to persistently store the content and metadata files in the data storage 204. The operation of the attachment processing module 512 is described below in more detail with reference to FIGS. 9A and 9B.

The file store and database interaction module 514 is used to store files, metadata files in another control and access information in the data storage 204. In one embodiment, the file store and database interaction module 514 is adapted for communication with the account creation module 506 and the attachment processing module 512 to receive and send data files and metadata files, and modify access control information and tokens. The file store and database interaction module 514 is responsive to signals from the control module 504. The operation of the file store and database interaction module 514 is described below with reference to FIGS. 6A, 7A, 8A and 11.

Methods for Email and File Transmission and Storage.

A. Account Creation and Authentication.

Figure 6A:
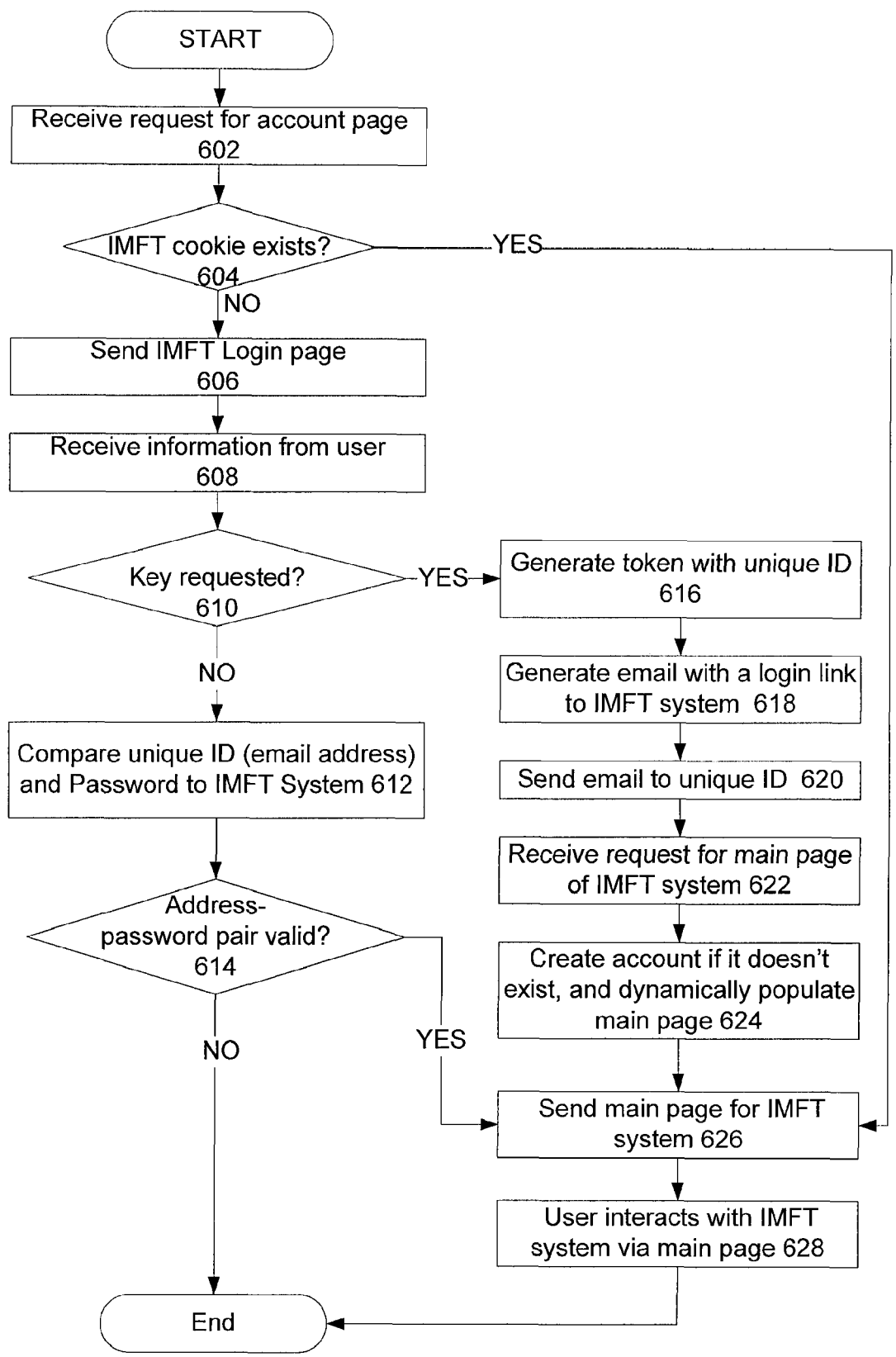
FIG. 6A is a flowchart of an embodiment of a method for creating and authenticating a user account in the IMFT system in accordance with the present invention.

One of the major advantages of the present invention is that it eliminates the requirement for passwords and automatically creates users accounts in the IMFT system 102. Referring now to FIG. 6A, a first embodiment of the method for automatically creating a user account and authenticating the account is shown. The process begins in step 602 when the IMFT system 102 receives a request for an account page. For example, such a request is received when a user points his browser at the login page of the IMFT system 102.

Next in step 604, with interaction between the IMFT system 102 and the client device 110, the method determines whether an IMFT cookie exists at the client device. If the user has previously accessed the IMFT system 102, an option was presented which allowed the user to allow for automatic access to the system. For example, one of the web pages provided by the IMFT system 102 provides a selectable checkbox to "Remember me on this computer." If user selected such an option during the prior session or access, the IMFT system 102 stored a non-expiring token in a cookie on the user's client device 110. From now on, for any connections to IMFT system 102 started from the same client device 110 will find the token stored in the cookie, and if the token is valid, the system authenticates the user specified by the token. Instead of presenting the login screen, a session is immediately opened. In this step, the IMFT system 102 checks 604 whether such a cookie exists, if so the user is already authenticated, and the method proceeds to step 626 where the main page for the IMFT system 102 is presented. If such a cookie does not exist the method proceeds to step 606.

Figure 6B:
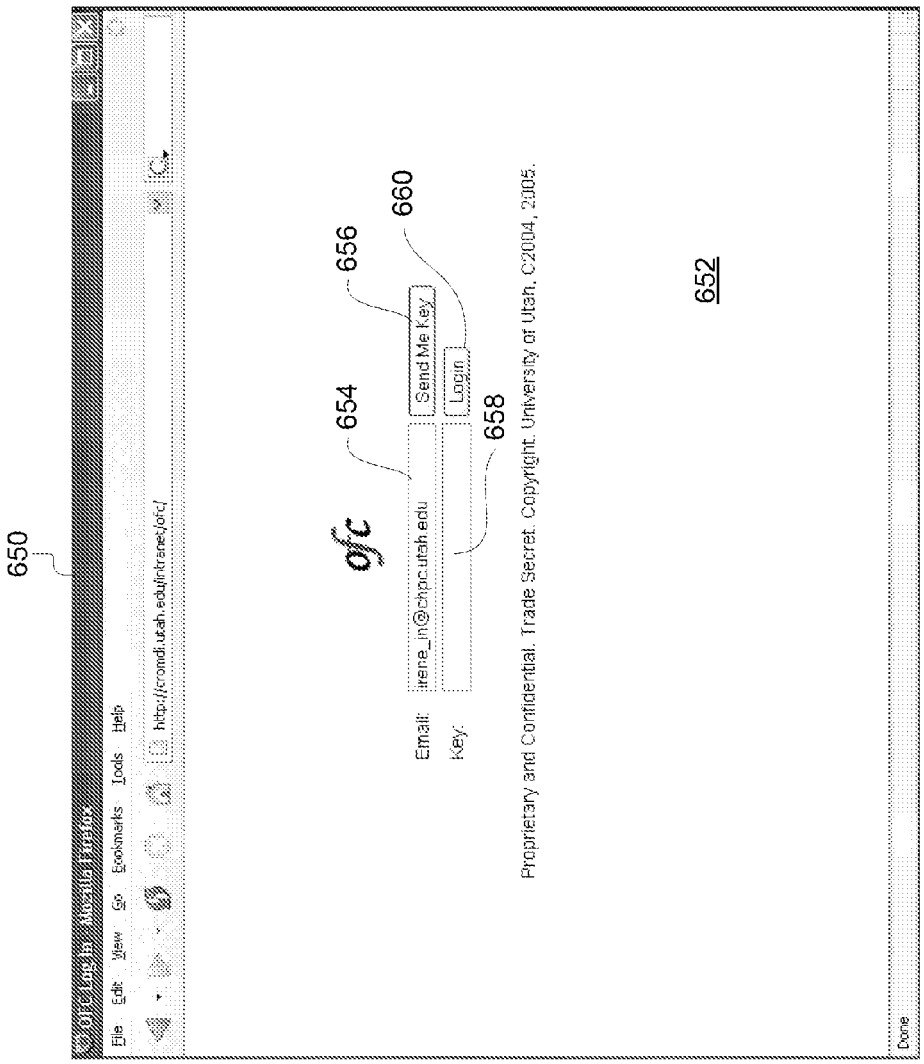
FIGS. 6B-6E are exemplary graphical representations of a display device showing interfaces for creating and authenticating a user account in accordance with the present invention.

In step 606, the method sends an IMFT login page to the user's client device 110. Referring now also to FIG. 6B, an exemplary graphical representation of a browser 650 with the IMFT login page 652 is shown. The IMFT login page 652 preferably provides a plurality of labels and fields including a field 654 for entering a unique ID (email address), a field 658 for entering a key or password, a "Send Me Key" button 656 for requesting a key to access the IMFT system 102, and a "Login" button 660 for sending the data in the field 654 and field 658 as an address/password pair to the IMFT system 102. Those skilled in the art will recognize that the unique ID may be any address the user has access to over a given communication channel. For example, if the communication channel is SMTP (email), then a communication address would be an email address that the user has access to. The user inputs data and then selects one of the buttons 656, 660 to send the information to the IMFT system 102. The information is received 608 by the IMFT system 102. In an alternate embodiment from that described below, the user need only input their unique ID or email address in the IMFT login page 652 and select the login button 660. In response, the IMFT system 102 generates a main page 670 that lists the files, if any, to which the user with the email address has access rights. This main page 670 is populated by searching the access control lists of each file in the IMFT system 102, and determining whether the input address is present. If present, the user is permitted to access the file and it is selected for population on the main page 670.

Next in step 610, the method determines whether a key was requested 610. This determination can be made if an identification of which button 656, 660 was sent is provided in the information. Alternatively, if the user does not provide a value in the key field 658, the IMFT system 102 assumes they are requesting a key.

Figure 6C:
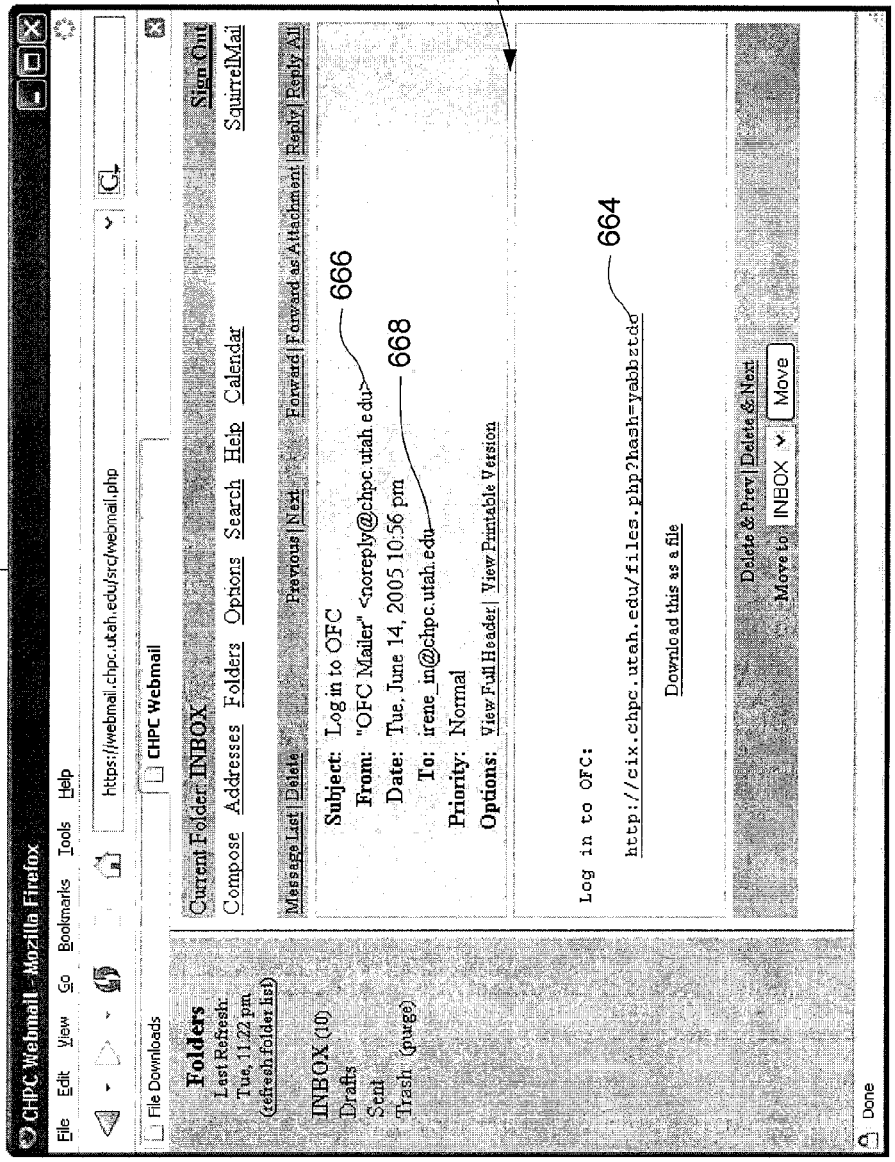

If a key was not requested 610, the user is trying to access the IMFT system 102 using a password. Referring now also to FIG. 6E, an exemplary graphical representation of a browser 650 with the IMFT login page 652 is shown. In this exemplary page, the user has input the address oscar.out@gmail.com in the field 654 for entering a unique ID, and a password in the field 658 for entering a key. The method continues in step 612 to compare the received unique ID (email address) and password received in step 608 to the account information stored in the IMFT system 102. In step 614, the IMFT system 102 determines whether the address password pair is valid. If so, the user is granted access, the IMFT system 102 opens up a session for the user, and the method proceeds to step 626 to present the main page. The session stays open until it times out due to inactivity, or the user logs out. If address password pair is not valid, the user is denied access and the process ends.

If a key was requested 610, the user is trying to access the IMFT system 102 without a password (passwordless). The IMFT system 102 then generates 616 a token using the unique ID. This token preferably identifies this user and includes information about what level of access the user has. For example, it could be limited to accessing a single file, accessing an account or may include other rights. The IMFT system 102 generates 618 an email with a login link to the IMFT system 102. The email generated in step 618 is sent 620 to the unique ID. Referring also now to FIG. 6C, an exemplary graphical representation of a browser 650 presenting such an email 662 is shown. When irene_in@chpc.utah.edu has clicked the "Send me Key" button 656, then an email 662 is sent to that email address. As shown in FIG. 6C, the email 662 is from 666 the IMFT system 102 and addressed to 668 the email address input, irene_in@chpc.utah.edu, see also FIG. 6B. More importantly, the email 662 includes a link 664 that when selected will provide access to the IMFT system 102.

Once the user receives and opens the email, the user clicks on the link. This causes the browser to send a request for the main page to the IMFT system 102. The request for the main page associated with the web link is received 622 by the IMFT system 102. If the matching token is still valid (hasn't expired), the IMFT system 102 performs the action encoded by the token, in this case opening up a session for the user. For example, the IMFT system 102 creates 624 a user account if one does not already exist for this email address and then dynamically populates the main page with information corresponding to the email address. The main page is then sent 626 to the user's browser. The user can interact 628 with the IMFT system 102 using the main page.

Figure 6D:
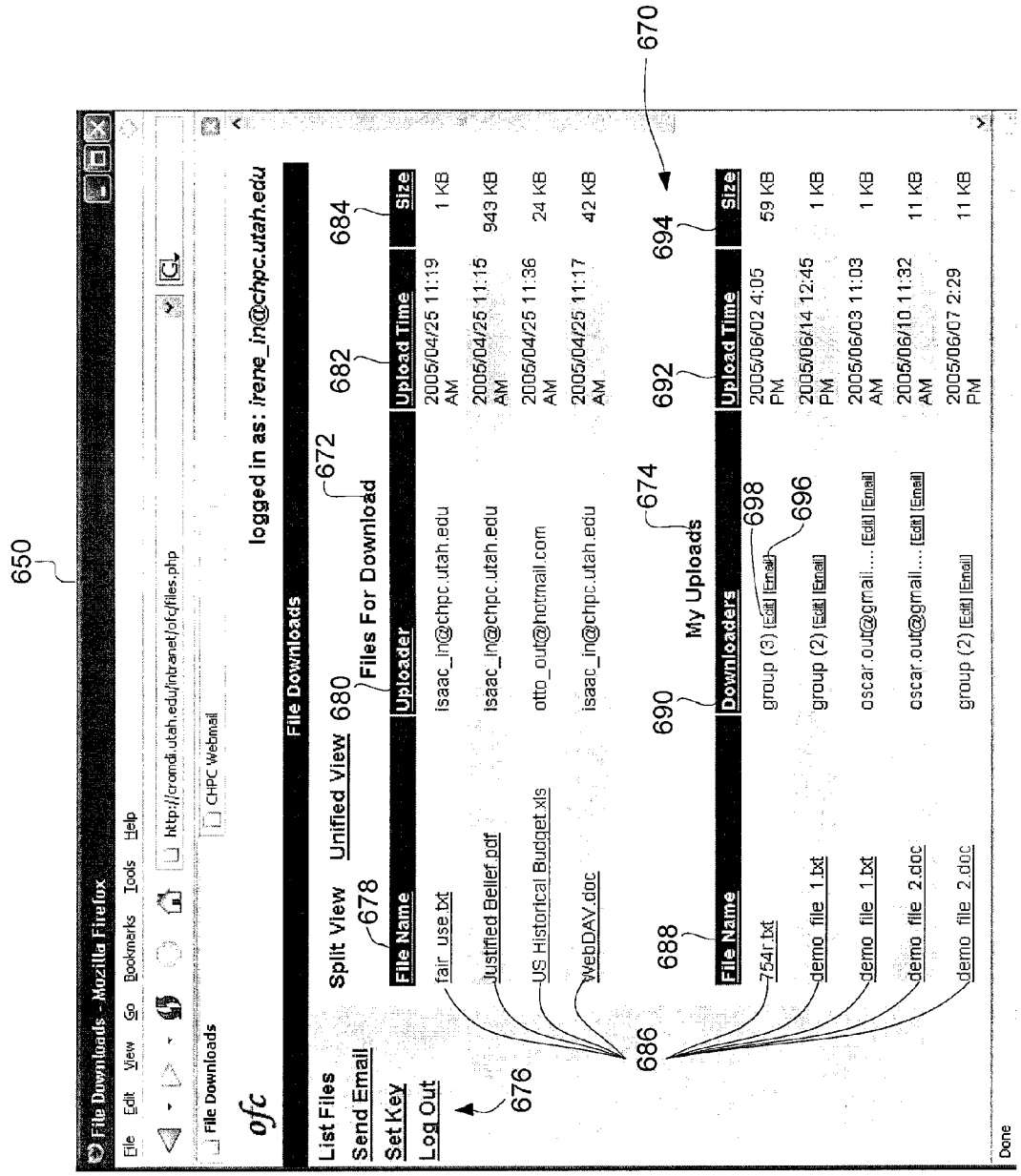
Figure 6E:
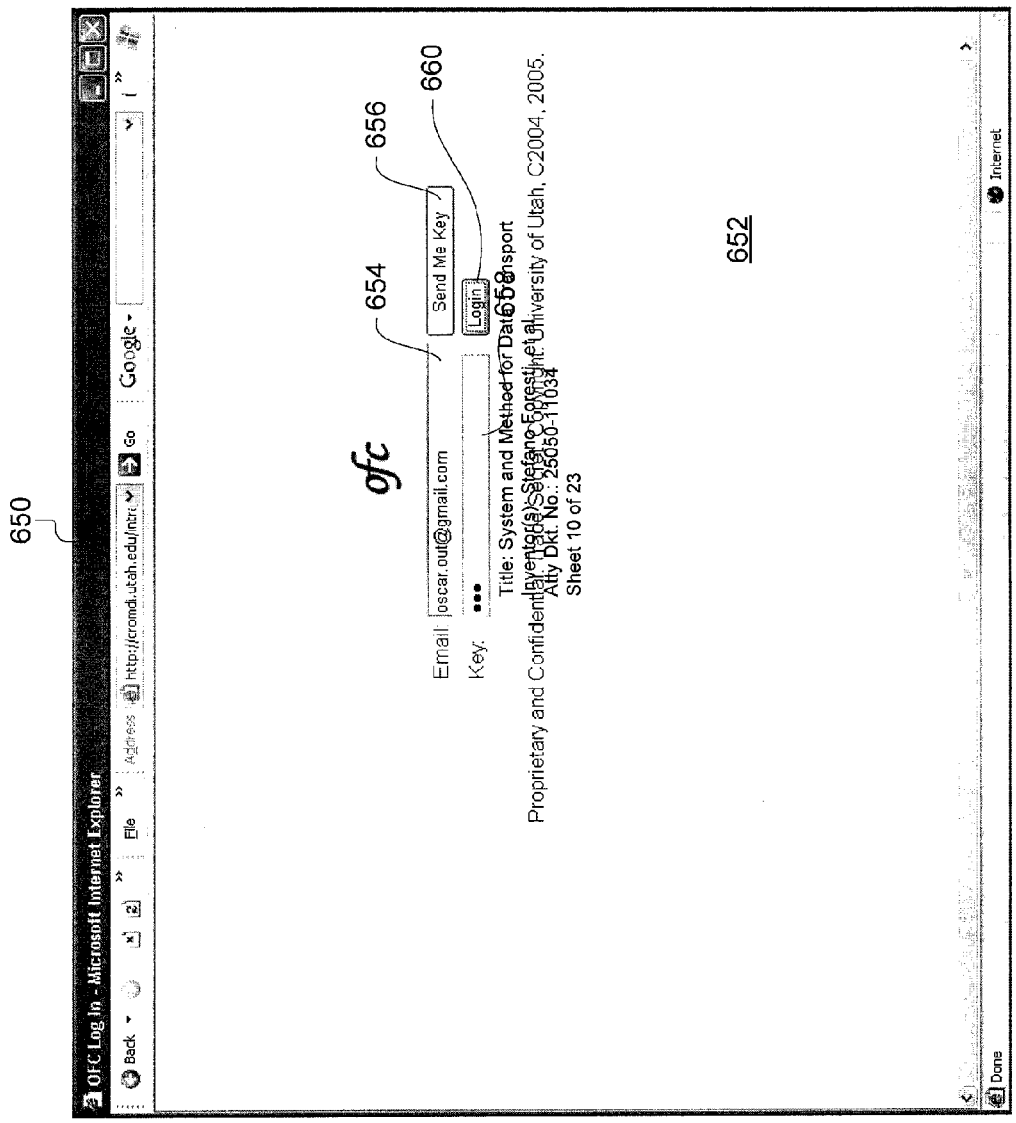

Referring now also to FIG. 6D, an exemplary graphical representation of a browser 650 presenting such a main page 670 is shown. The main page 670 associated with a user account contains the List Pane. The List Pane lists all the objects, files and email that the user has access to. From the main page 670, specifically from the List Pane in most cases, the user can perform (or at least initiate) all the actions he/she is authorized to on all the objects he/she has access to: uploading, downloading, sending, or viewing files, assigning or revoking access rights to files for other users, performing searches, editing the contact list, changing account options, and so on. As shown in FIG. 6D, the main page 670 includes the user account, irene_in@chpc.utah.edu, in the upper right corner. The List Pane is divided into a first section 672 for listing files available for downloading, and a second section 674 list files that the user has uploaded to the IMFT system 102. The downloads are files that others made available to Irene. In this case, the relevant information to show is the sender. The uploaded files are ones that Irene made available to other email addresses. In this case the file list indicates the list of email addresses that have access to this file which can be: private and only for the owner/sender, to one email, or to a plurality of emails. Within each of these sections there are columns for file name 678, 688, uploader 680, downloader 690, upload time 682, 692, and size 684, 694. The file names 686 for each file are specifically enumerated. It is important to notice that the timestamp of the files is permanent and multiple files with the same name can be in the file list. The view of files can also be changed to display uploads and downloads mixed, and sorted by time, or file name, etc. This main page 670 also includes buttons 696, 698 for editing the access control for an uploaded file, and for emailing the file to another party using this integrated mail file system 102. Finally, the main page 670 includes a navigation link area 676 for transitioning to other web pages for sending email, setting a key or logging out.

B. Accessing the IMFT System.

Figure 7A:
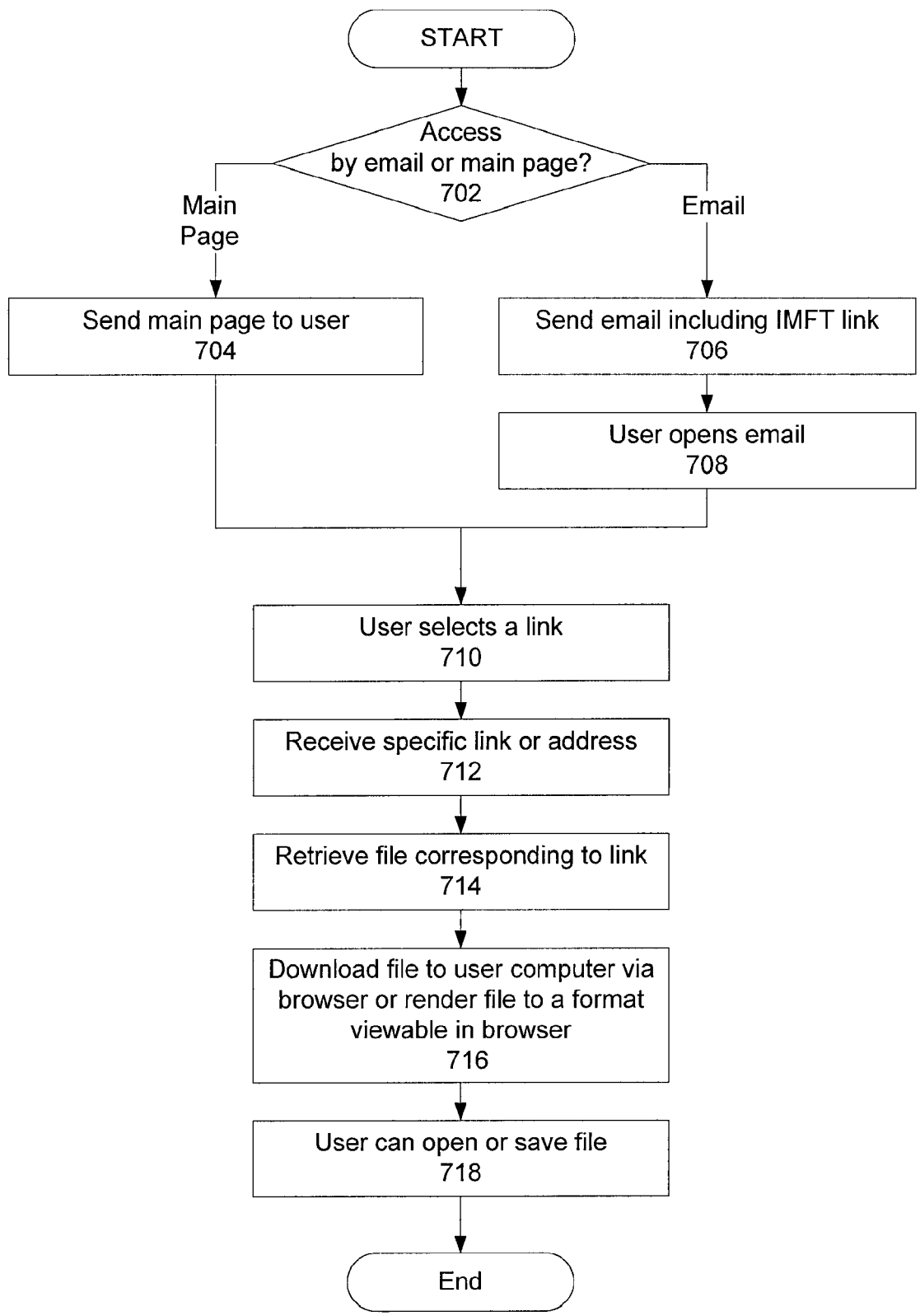
FIG. 7A is a flowchart of an embodiment of a method for accessing the IMFT system and files in accordance with the present invention.
Figure 7B:
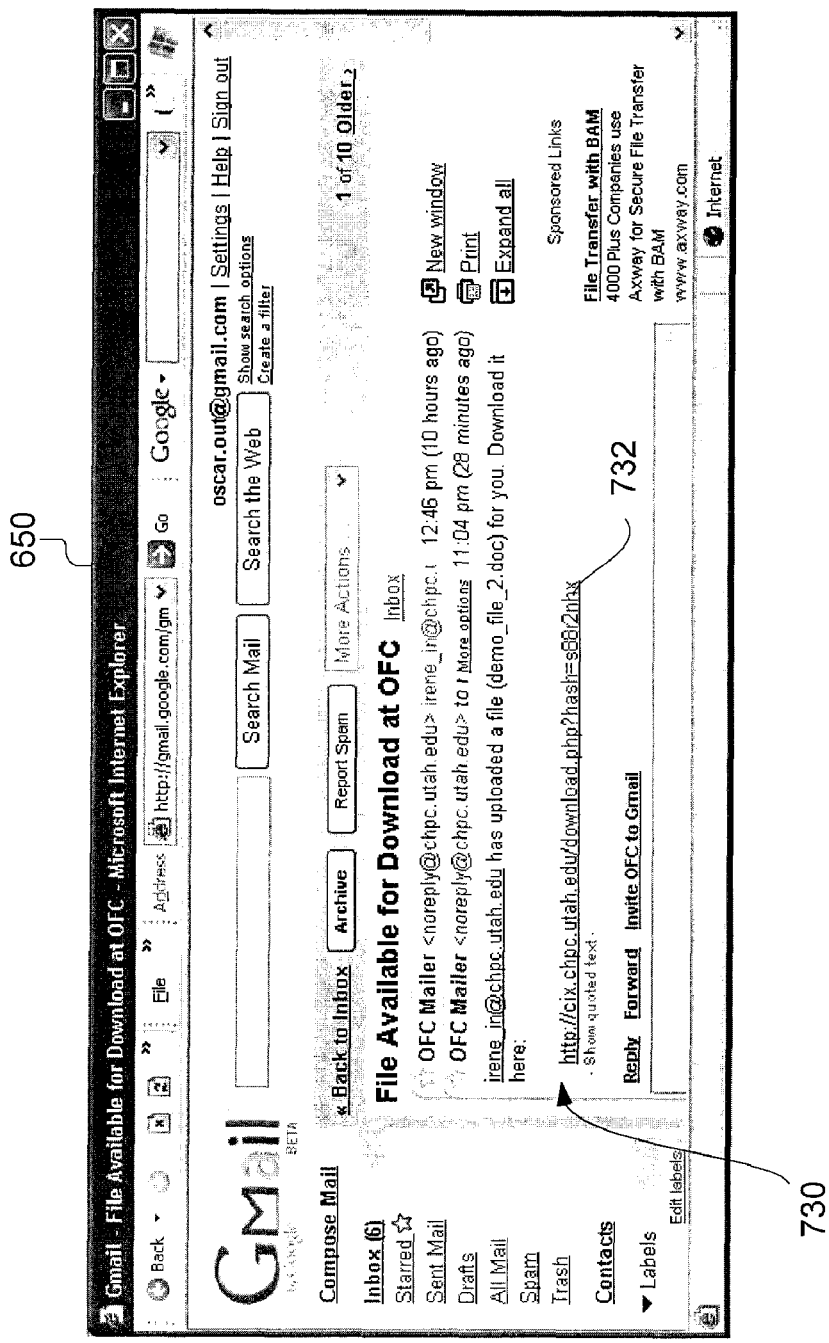
FIG. 7B is an exemplary graphical representation of a display device showing an email generated by the IMFT system in accordance with the present invention.

Referring now to FIG. 7A, the method for accessing the IMFT system 102 and files in accordance with the present invention will be described. The IMFT system 102 first tests 702 whether access to the IMFT system 102 is being accomplished by email or via the main page 702. Access or viewing a file includes directly or indirectly downloading a file. If access to the IMFT system 102 is being accomplished by the main page, the method transitions to send 704 the main page the user, after which the method proceeds to step 710 where the user selects a link. On the other hand, if access to the IMFT system 102 is automatic because an email has been intercepted by the IMFT system 102, the method proceeds to step 706 send an email including an IMFT link to the user. Next in step 708, the user opens the email. In step 710, the user selects a link in the email. Referring now also to FIG. 7B, an exemplary graphical representation of a browser 650 presenting such an email 730 is shown. The email 730 can by on any external email system such as Gmail in this exemplary case.

FIG. 7B shows an example of the email 730 sent in step 706, opened in step 708, and the link 732 selected by the user in step 710.

In step 712, the IMFT system 102 receives a specific link or address from the user. Then in step 714, the IMFT system 102 retrieves the file corresponding to the link. The link typically also includes a token. The token is compared to table stored in the data storage 204 to ensure that the user is authorized to access the file. In one embodiment, the token is a key code that, in the IMFT system 102, points to a set of authentication/authorization credentials, i.e., information specifying who can perform what action and when. Tokens can be expiring (they are only valid within a specified time range) or non-expiring (always valid). For example, an expiring token could point to the following information: "user A, currently logged in from IP address X, is allowed to download file Y as long as the user's request is received within 15 minutes from this token creation timestamp". In another embodiment, tokens that have been used are no longer recognized as valid by the IMFT system 102. Next in step 716, the file is downloaded to the user's computer via a browser 650. In yet another embodiment, if the IMFT system 102 has the capability to render the file to a format that is displayable by the browser 650, the IMFT system 102 renders the file and sends the rendered files to the browser 650 of the user. For example, a spreadsheet file could be first be rendered by the IMFT system 102 as a bitmap, and then the bitmap is displayed in the user's web browser 650. Finally, in step 718, the user at the client device 110 can then open or save the file in a conventional manner such as when files are downloaded. The operating system on the client device 110 displays the "Open/Save to disk" dialog, allowing the recipient to download the file.

C. Modifying Access Controls.

Figure 8A:
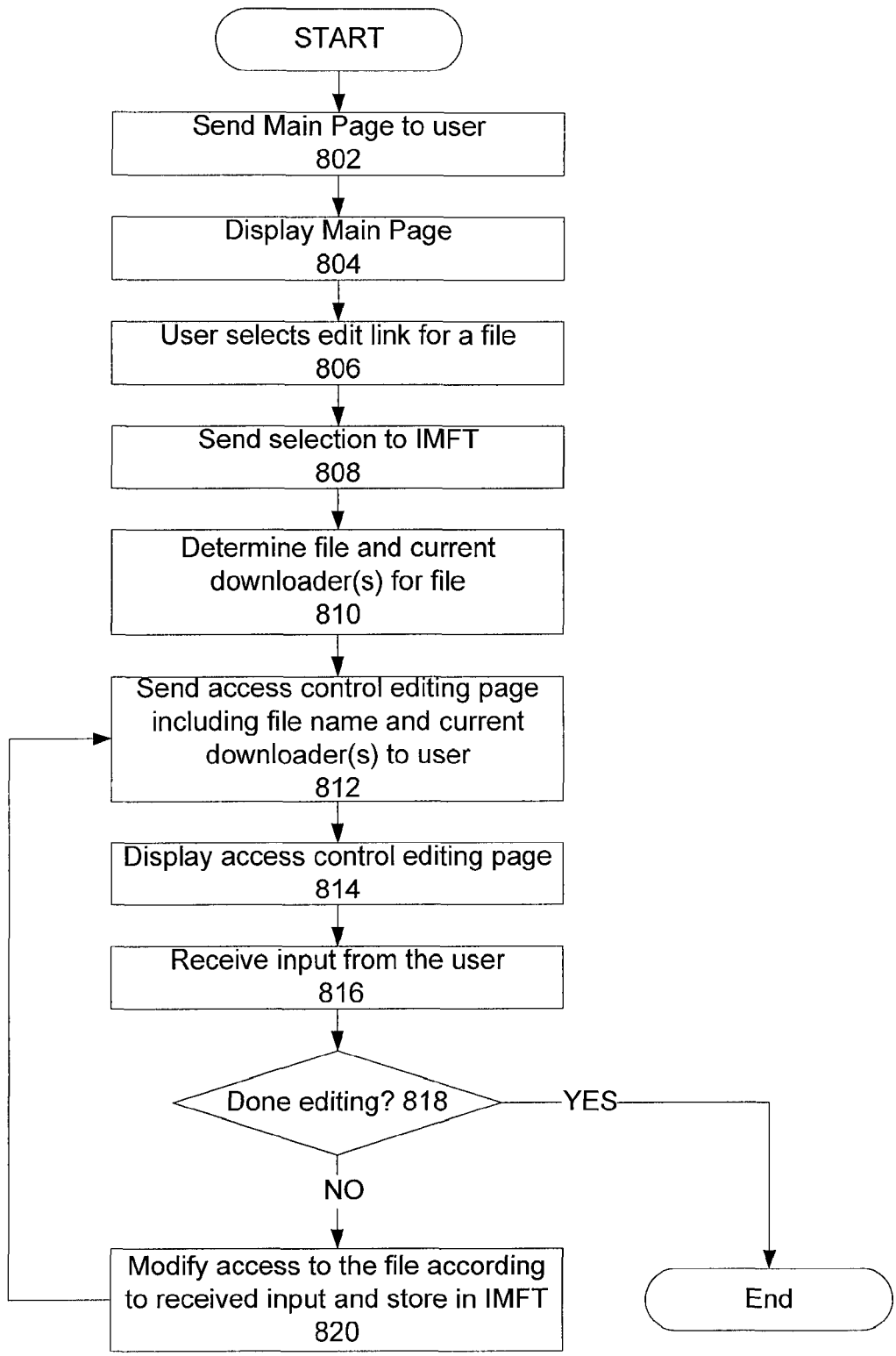
FIG. 8A is a flowchart of an embodiment of a method for modifying access controls for a file in the IMFT system in accordance with the present invention.
Figure 8B:
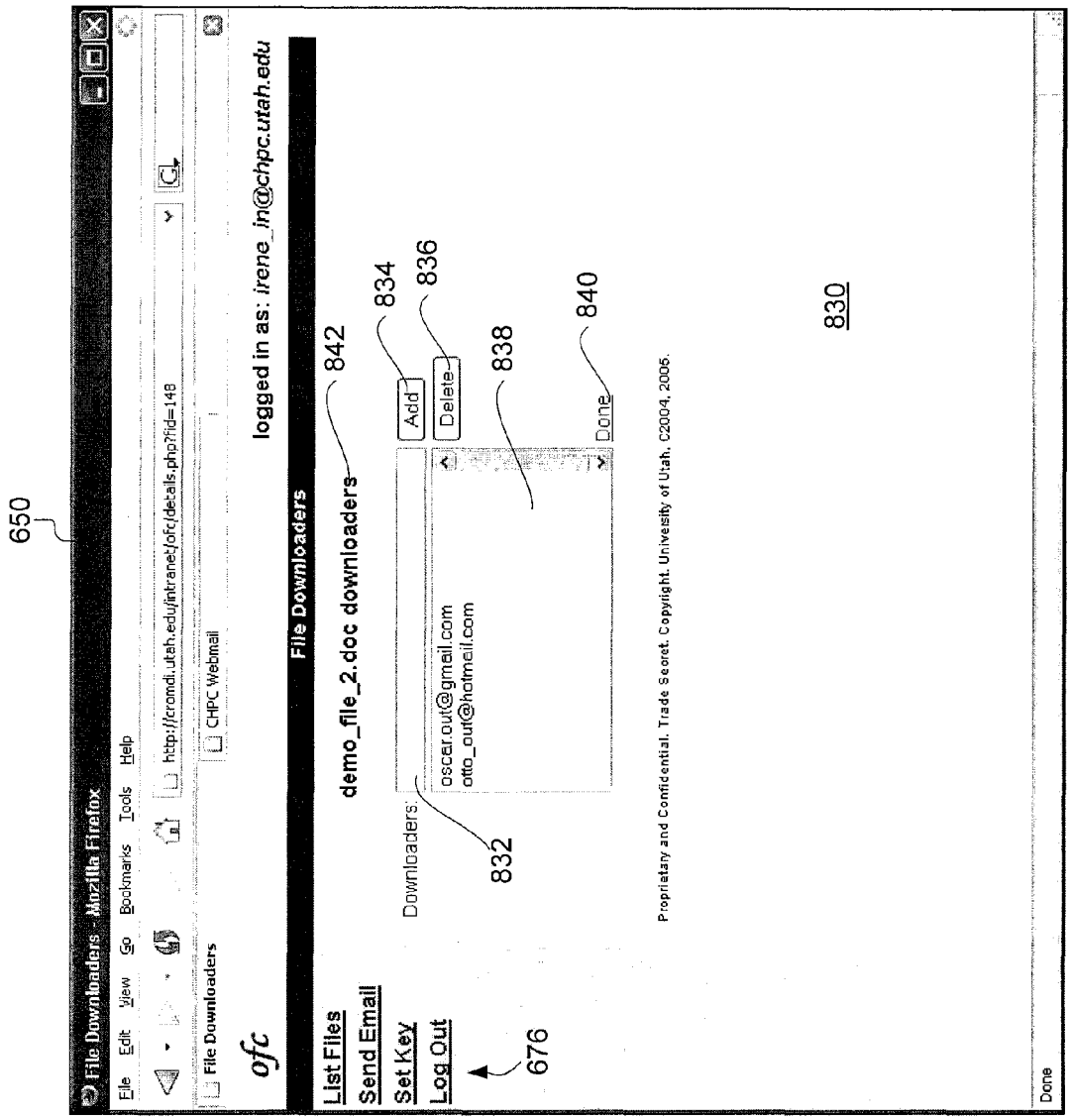
FIGS. 8B and 8C are exemplary graphical representations of a display device showing interfaces for modifying access controls in accordance with the present invention.

Referring now to FIG. 8A, an embodiment of a method for modifying access controls for a file in the IMFT system 102 is described. It is assumed that the user modifying the file access is the file owner. Changes to file access include granting access and revoking access. The process for modifying access controls for files and patronage begins in step 802 with the IMFT system 102 sending a main page 670 to the user. Next in step 804, the main page 670 is displayed on the user's client device 110. An exemplary main page 670 has been described above with reference to FIG. 6D. Then in step 806, the user clicks the edit link 698 for a file 686. The selection input by the user is sent 808 to the IMFT system 102. The IMFT system 102 determines 810 the file corresponding to the selected link 698 and retrieves a list of the users authorized to download the file. The information from step 810 is used to populate a web page and an access control editing page 830 including the file name 842 and a list 838 of the current authorized users is sent 812 to the client device 110. The access control editing page 830 is then displayed 814 to the user at the client device 110. Referring now also to FIG. 8B, one embodiment for the access control editing page 830 is shown. The access control editing page 830 includes a field 832 for inputting additional IDs (email address) to grant access to the file, a window 838 listing IDs that already have access, an "add" button 834 for adding an ID, a "delete" button 836 for deleting an ID, and a "done" link 840 for indicating completion of modification of the file access. The user inputs data and commands using the access control editing page 830, and this information is received 816 by the IMFT system 102. The method next determines 818 whether the command indicating the user is "done" (editing the access controls) was selected. If the command indicating the user is "done" editing the access controls was selected, the method is complete and ends. However, if addition information other than the "done" command was input, the method continues to step 820 where the IMFT system 102 modifies access to the file and according to the received addition information input and stores the information in the data store 204 of the IMFT system 102. After step 820, the method loops to step 812 and sends the user an updated access control editing page 830 that now includes the modifications that the user input. Those skilled in the art will recognize that when a file is uploaded to the IMFT system 102, similar web interfaces may be presented to the uploader to set the access control upon uploading. When a file is uploaded to the IMFT system 102, the uploader becomes the root owner of that file. Moreover, it should be noted that the owner of file may implicitly and automatically revoke access to the file by deleting the file from the IMFT system 102.

Figure 8C:
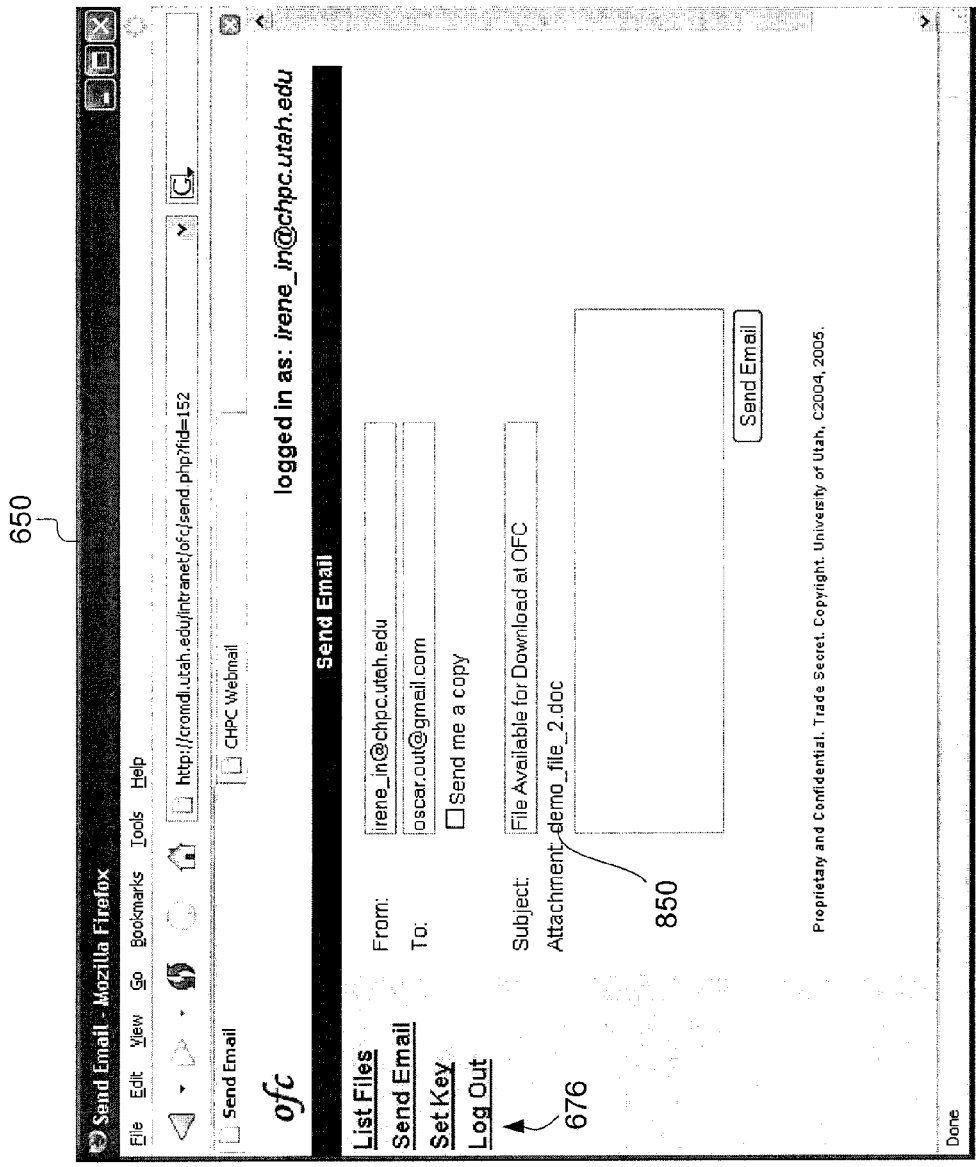

Referring now also to FIG. 8C, another method is illustrated where the access control for a file is automatically modified by the IMFT system 102. In this example, a user is sending an email from the IMFT system 102. The IMFT system 102 presents a web page interface as shown in FIG. 8C. Since the sender has an account in the IMFT system 102 and has attached a file "demo_file_2.doc" 850, the IMFT system 102, once this email is sent by the user automatically modifies the access control settings on the file "demo_file_2.doc" 850 to allow access by the addressee of the email, oscar.out@gmail.com. Thus, once the email is received by the addressees, it will include a link to the file, and this addressee will have access. If the file attached is not yet in the IMFT system 102, the file is uploaded or added to the IMFT system 102 and the sender becomes the root owner of the file. Similarly, if the email is sent from a system outside the IMFT system 102, but is detected by the email server 210, the attachment filter 206 removes the attached file, replaces it with a web link in the email message, then passes the file and related metadata to message & file control server 202 which in turn makes the file available from the IMFT system 102 and grants the email sender and recipients access to the file. In this case, the email sender becomes the root file owner.

D. Attachment Filtering.

Figure 9A:
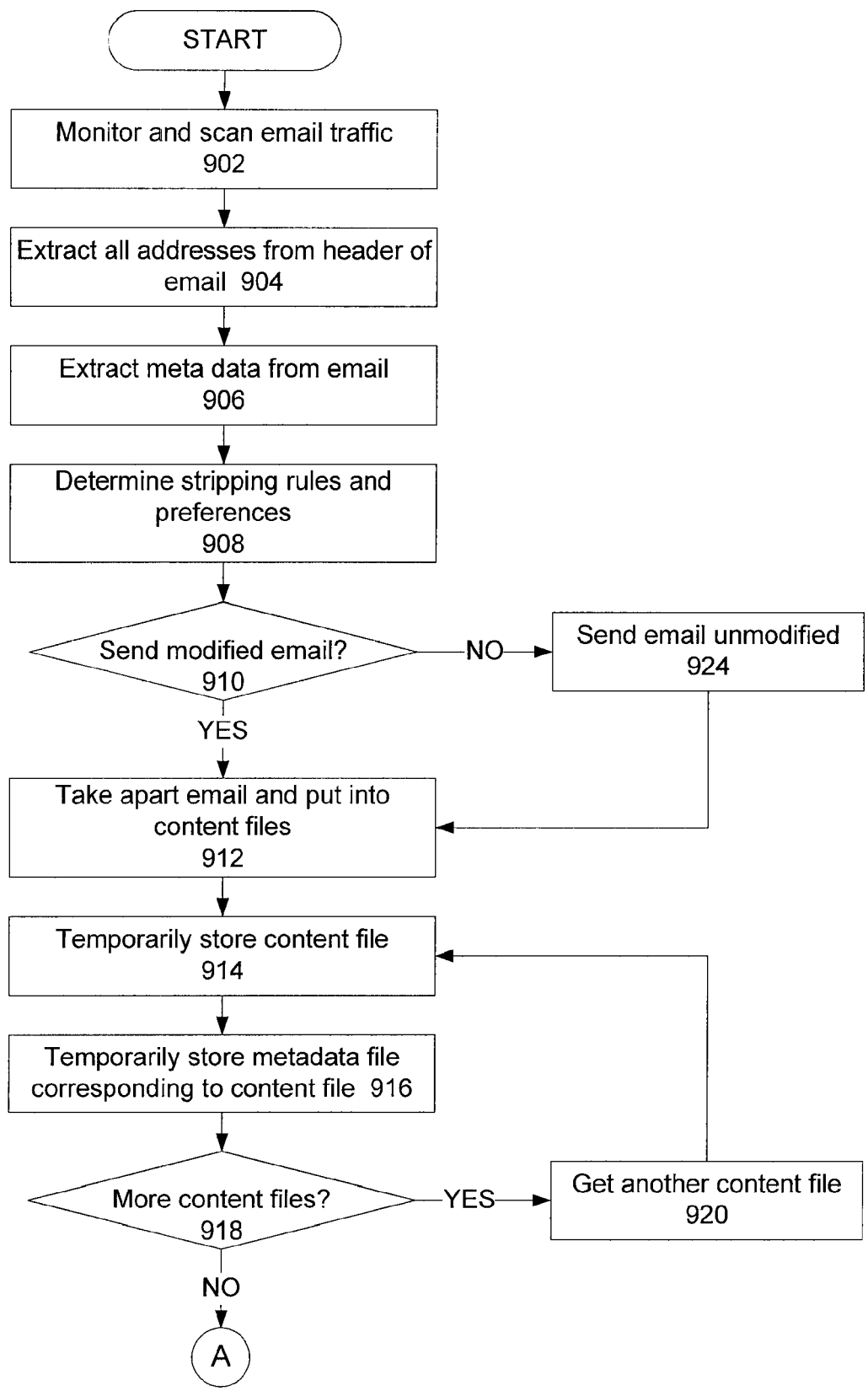
FIGS. 9A and 9B are a flowchart of an embodiment of a method for removing attachments and email bodies in accordance with the present invention.
Figure 9B:
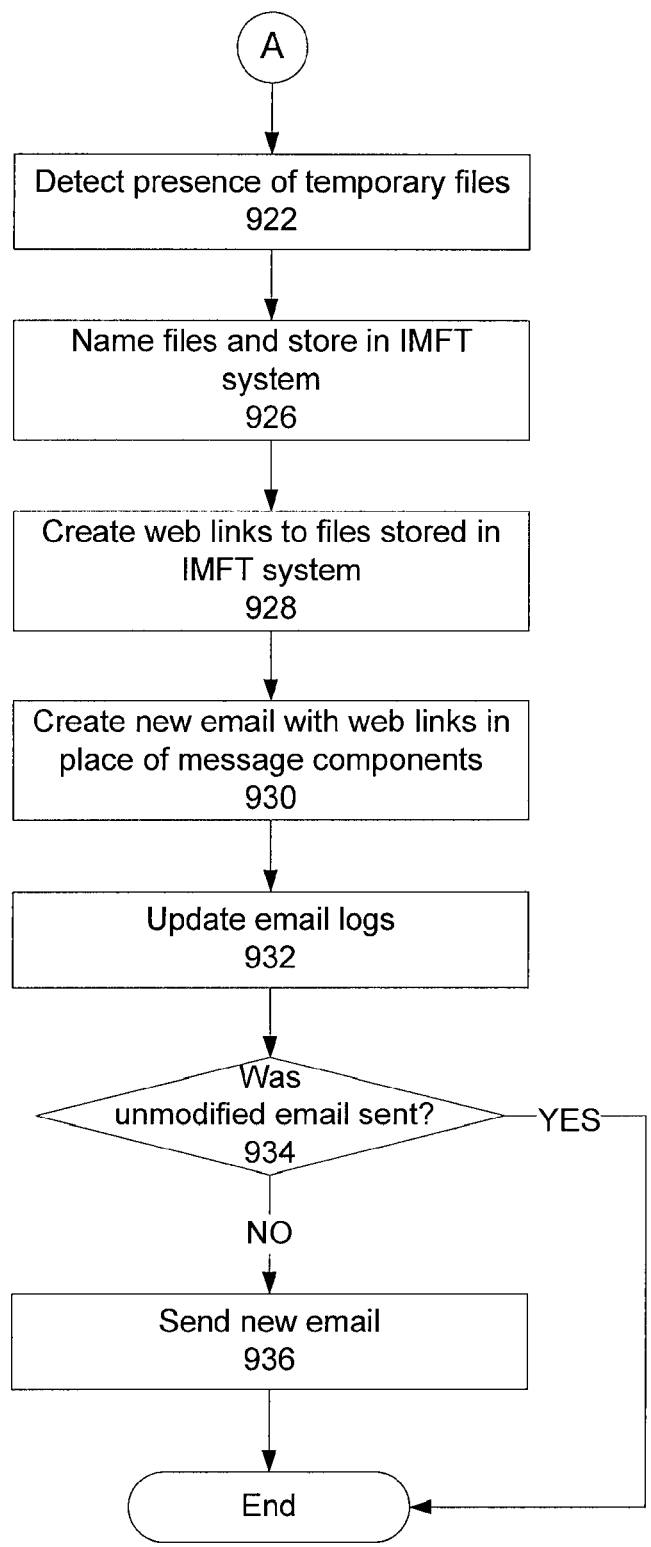

Referring now to FIGS. 9A and 9B, an embodiment of the method for filtering attachments is described. The method begins by monitoring 902 and scanning the email traffic (inbound, outbound, and internal to the local email server 210). In one embodiment, the attachment filter 206 leverages existing technologies to unobtrusively monitor email traffic. For example, a virus scanner such as AMaViS is used as an adapter and an abstraction layer between the email server 210 and attachment filter 206. The virus scanner interfaces with the email server 210 to extract the email messages from a queue. The virus scanner routes the messages to any number of processing utilities (other filters), and takes the processed messages from the last utility in the chain (attachment filter 206) and injects them back into the queue. The attachment filter 206 is preferably positioned downstream in the chain of email processing utilities from any virus scanning or spam filtering modules to prevent the attachment filter 206 from becoming a security concern.

The method takes each email and performs the remaining method step on it. Next, the attachment filter 206 extracts 904 all addresses from the header of the email. Email message headers contain the sender address and up to three lists of recipient addresses. The "To:" list is always present, while the "CC:" and "BCC:" lists are optional.

Once the address information is extracted, the method extracts 906 metadata from email. The attachment filter 206 analyzes the email header and the meta-data contained in the MIME stream to extract information about each message component. Of all the possible component types, the subject+body and any attachments can be stored by the attachment filter 206 as files on the message & file control server 202. Based on the meta-information extracted by the attachment filter 206, the business logic in the message & file control server 202 determines the ACL of each file, aggregates the components of each message showing which file is a body and which files are attachments to that body, and authorizes users to access and manage files via web server 208 of the IMFT system 102. The meta-information for each component combines meta-data from the message header and from the MIME stream, and includes: 1) a Unique Object ID which is used as the basename of the file on the web server 208 and also as the basename of the web link to the file. The Object ID is typically built as a hash of data that uniquely identifies the component, such as the ID of the email message it was part of, the message timestamp, the current system timestamp, a checksum, etc.; 2) a Message ID from the email header; 3) a Sender; 4) a Recipient(s)—"To:" list of recipients, "CC:" list of recipients and "BCC:" list of recipients; 5) a Message "Date:" field; 6) a System timestamp; 7) Object type of either Subject+body that is a list of all the Object IDs of all the attachments to this message so that the original message can be reconstructed, or an attachment that has an Object ID of the body of which this object was an attachment and an Original file name; 8) a Content type; 9) a File size; and 10) Full pathname where the file will be stored by the attachment filter 206.

The method also determines 908 the stripping rules and preferences set by the administrator. For each matching address, the message & file control server 202 returns user-defined preferences controlling how the email message should be processed. More details on these user-defined settings as well as related admin rules and system defaults are provided below.

Next, the method determines 910 whether the email should be modified before it is sent. The attachment filter 206 evaluates the meta-information extracted from the MIME stream (whether attachments are present and, if they are, their type and size) and compares it with a combination of stripping rules set by the IMFT system 102 administrator and stripping preferences specified by the message sender and recipients. If, based on the information returned by the message & file control server 202, the attachment filter 206 determines that no further processing is required for a message (send the message unmodified), the message is sent 924 on to the email server 210 for delivery, and the process continues to step 912 to record appropriate information. It should be understood that the stored appropriate information can be used for things like serving the file to the user from the web interface, even if the email was sent unmodified. On the other hand, if it is determined that the email should be sent modified, the method transitions directly from step 910 to step 912.

In step 912, the IMFT system 102 takes apart the email and puts it into content files. An important feature of the present invention is that the present invention converts the email message body into a content file. Similarly, any attachments to the email are converted into respective content files. In one embodiment, this step is performed using an existing software library written in Perl called MIME-Tools. Such existing libraries deal with all the lower-level details of the hierarchical structure, trees of different representations, encodings and differences in rendering the message body.

Next in step 914, each of the content files is temporarily stored. Based on all the information received from the message & file control server 202 and the metadata extracted from the MIME stream, the message & file control server 202 determines which MIME segments should be processed further and ultimately be converted into files. For example, the attachment filter 206 could re-generate the native version of a document starting from its base64-encoded MIME segment. Once the native version is produced, all the other representations and encoded versions of that document that are stored in other MIME segments are ignored. The newly generated file is stored on the web server 208 for publishing, under the control of message & file control server 202. The location of the file storage, the directory tree organization, and the file naming convention are configuration settings shared by all the IMFT system 102 subsystems.

Then in step 916, the IMFT system 102 temporarily stores a corresponding metadata file for each content file. Using the information gathered in steps 904, 906 and 908, the attachment filter 206 generates a file of metadata for each of the content files stored on the web server 208. The file with metadata is stored alongside the associated content file. A simple naming convention, where a content file and its associated metadata file share the same basename, allows the message & file control server 202 to correctly identify the files. This process allows the attachment filter 206 to transfer files to the message & file control server 202 unidirectionally, avoiding the overhead of a more complex handshaking protocol. In an alternate embodiment, the files are placed directly in their final locations in the data store, the handshaking protocol is more complex and uses a custom handshaking protocol to stream all the metadata.

In step 918, the method determines whether additional content files exist and need to be temporarily stored. If so, the method proceeds to step 920 to retrieve the next content file. The method then proceeds to step 914 and step 916 to temporarily store the content file and the metadata file associated with the content file. This process is repeated for each content file associated with a particular email. Once there are no more content files to be temporarily stored, the method proceeds from step 918 to step 922. It should be noted that the attachment filter 206 is responsible for extracting the content files, and the metadata files from the original email and placing them into temporary storage. Thereafter, from step 922 on, the method is largely performed by the message & file control server 202. In step 922, the message & file control server 202 detects the presence of temporary files. The message & file control server 202 next names 926 the files and stores 926 them in the IMFT system 102. Next in step 928, the method creates web links to the files stored in the IMFT system 102 in step 926.

In step 930, the message and file control server 202 creates 930 a new email with web links in place of the email components, in particular, the attachments and message body. The combination of administrative rules and user preferences determines which of the original message parts are retained in the modified email message and which ones are replaced by web links. If a message part is removed from a message, all its representations and encodings are removed from the MIME stream. When web links need to be inserted into a message body, the attachment filter 206 handles the several possible body formats. In a plain text format, the links are added to the body together with a standard text explaining what the links represent and what generated them. In generic HTML the following rules are followed to avoid damaging the message structure, formatting, and intended appearance. If the message only contains embedded images, don't strip anything. The images are most likely part of the message format and must be left untouched. Otherwise, a neutral-looking panel is added to the message, with the links represented nicely as icons matching the file type (zip, image, doc, ... ). Depending on IMFT system's 102 ability to correctly render dynamic content, embedded scripts or styles may be scrubbed when the body is extracted and stored as a file. In proprietary formats, special features of customized formats, for example email messages generated by Outlook, can be exploited to make the web links look like regular attachments when viewed in the client's attachment pane or tab. Typically, the web links are inserted in the original body of the message. If the body was also removed, a new standard body is generated in two representations, plain text and HTML. The body will only contain the web links and some standard text explaining what the links represent and what generated them.

Then email logs which are maintained by the attachment filter 206 are updated 932. The attachment filter 206 logs several pieces of information about each processed message for troubleshooting and tracking purposes. The logged information includes: 1) Message ID either generated internally or from the email header; 2) Sender; 3) Recipient(s):—To:" list of recipients, "Cc:" list of recipients and "Bc:" list of recipients; 4) Message "Date:" field; 5) System timestamp; 6) For each attachment an Original file name (from MIME metadata), a Content type (from MIME metadata), a File size and a Full pathname where the file was stored by the attachment filter 206. The present invention is particularly advantageous in that an original copy of the email and its metadata are stored in a temporary log maintained by the attachment filter 206. For increased service reliability, the whole MIME stream of each message is preserved on short-term storage. In case of corruption, message failure, or other unexpected circumstance, this log can be used to recreate the email and/or reprocess the email. If attachment filter 206 determines that the attachment delivery was acknowledged by message & file control server 202, then the short-term copies of the MIME streams for the messages are discarded. Otherwise, the attachment filter 206 causes the messages to bounce back to the sender with a notification of failed delivery.

Next the method determines whether the unmodified email was sent in step 934. If it was, the method is complete and ends. In this case, the steps of FIG. 9B are performed to ensure that a copy of the email is archived persistently on the IMFT system 102. If the unmodified email was not sent, then the new/modified email is sent 936 and the method is complete and ends. In one embodiment, the email is sent by passing it back to AMaViS. Since the attachment filter 206 is the last link in the chain of email processing utilities, AMaViS puts the messages back in the email server queue.

In summary, the transfer process takes place in three phases. First, for each object to be delivered to the message & file control server 202, the attachment filter 206 store two files on the server 208: the actual content file and an associated file with metadata. Second, the message & file control server 202 detects the presence of metadata files and picks them up. Third, the attachment filter 206 detects that metadata files have been removed by the message & file control server 202. This highly-decoupled process increases service availability, improves performance, and minimizes architectural dependencies between the two subsystems.

Yet another advantage of the present invention is that system administrators and users have the ability to fine-tune the attachment filter's behavior in a number of ways. Those skilled in the art will realize that the configurable aspects of the attachment filter 206 described below are not exhaustive and only provided by way of example. The system administrators using the attachment filter 206 can prescribe the 1) file type of attachments that must be replaced by a link; 2) size of attachments that must replaced by a link; 3) size limit for attachments; 4) user quota for file storage; and a 5) Verbosity level of logs with different levels are available for monitoring normal operation of for performance tuning or troubleshooting. Similarly, the users may set filtering options for inserting links such as using a web page that allows configuration. For example, the attachment filter 206 replace or not replace a portion of a message depending on the content type of a message part (subject+body or attachment) and different size ranges. Possible actions include: 1) do not replace content file with a link—the body or attachment is not processed by the attachment filter 206. It is delivered to the recipients inside the email message and it's not added to the sender's file repository; 2) add a link to email—the subject+body or attachment is extracted from the email message and is added to the sender's file repository, but it's not removed from the message. The recipients will receive it via email as usual; and 3) replace content file with a link—the subject+body or attachment is extracted from the email message, it is added to the sender's file repository, and is also removed from the message. The only way for the recipients to get this item is to click on the web link that replaces the item in the email message. Moreover, the present invention provides a special Low resolution checkbox that determines whether a lower-resolution version of the image is sent and/or extracted. Image scaling and format conversion may be used to reduce the size of the images.

Attachment replacement rules are based on content type and file size, and are a combination of system-wide admin settings plus user preferences. Users can in some cases overrule any stripping rules in effect on a message-by-message basis.

Finally, the user can also set Link Style and Position Options. Links are inserted in the email message to replace the original body or an attachment can be customized in several ways: 1) Link position at the top or at the bottom of the message; 2) Link style inside an HTML body; 3) Plain text links or links represented by icons that match the document type (image, archive, multimedia, and so on); and 4) with explanation text, predefined or custom, added by the attachment filter 206 to briefly explain to the recipients what the web links represent and how they were inserted.

Figure 10:
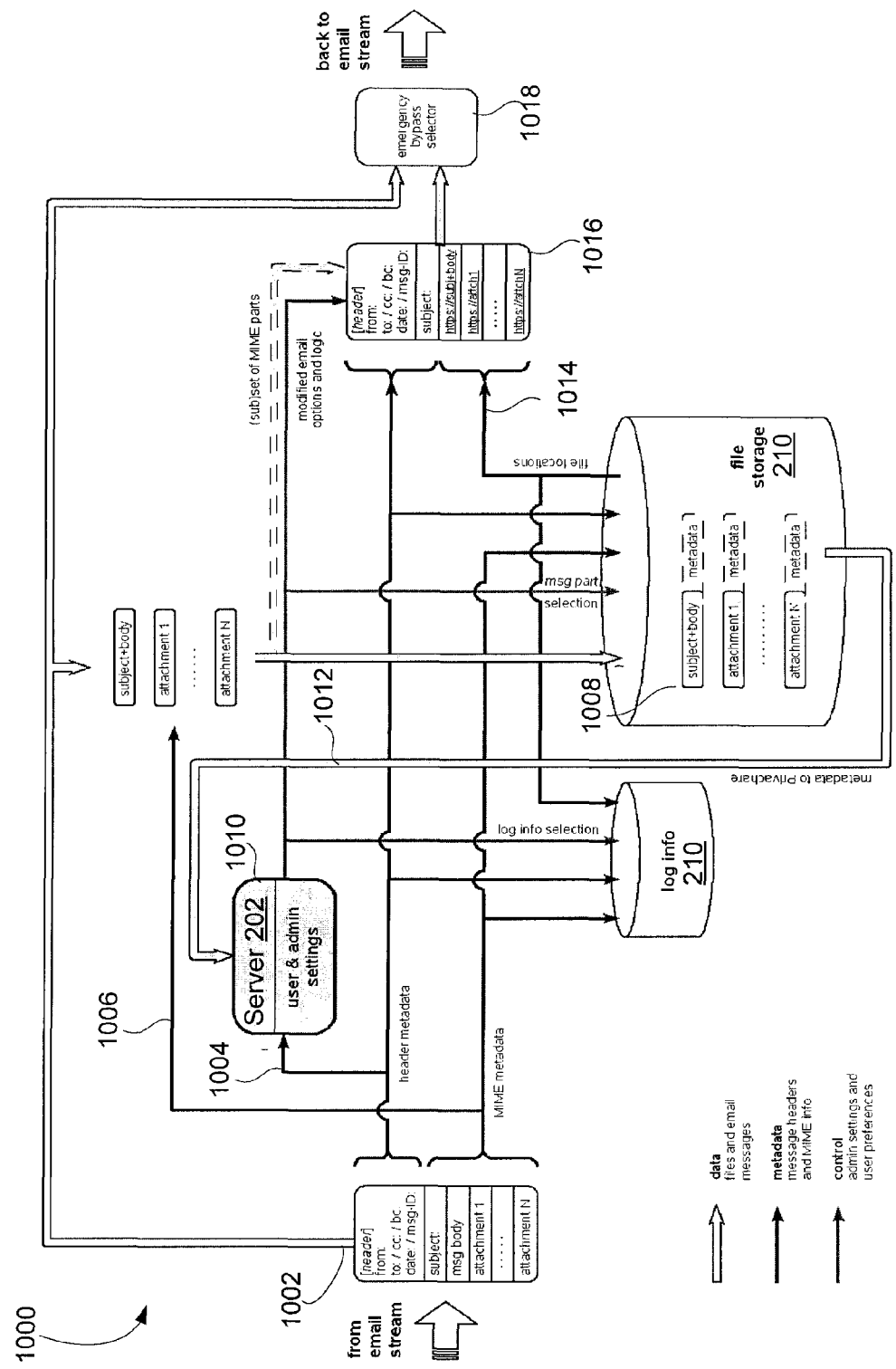
FIG. 10 is a block diagram of an embodiment of an attachment filter in accordance with the present invention.

Referring now to FIG. 10, an exemplary embodiment 1000 for the attachment filter 206 is shown. FIG. 10 illustrates the various data paths, control paths and metadata paths within the attachment filter 206. FIG. 10 also illustrates a variety of options for processing original emails according to a variety of different set parameters that may be set by the system administrator. In the exemplary embodiment 1000, the attachment filter 206 operates in a manner similar to virus scanning in that a queue is provided for a stream of the incoming emails and a queue is provided for a stream of outgoing emails. The attachment filter, 206 is positioned between the two queues to process the emails in line. The process begins when an original email is received 1002. The sender and recipient information for the email is extracted and sent 1004 to the message and file control server 202. Then MIME metadata is used to break apart 1006 the message. The MIME parts are stored 1008 as files on the email server 210. The message and file control server 202, then determines 1010 the composition of format of a modified message and login information for the message. The message and file control server 202 then persistently stores 1012 the message and the file metadata in the data storage (not shown in FIG. 10). Then the file locations in the file storage of the email server 210 are used to build 1014 web links. The modified message is then ready 1016 for transmission in the outgoing mail stream. This exemplary embodiment 1000 also includes an emergency bypass selector 1018 for passing the email message out unmodified by the IMFT system 102.

E. Integrated Methods.

Figure 11:
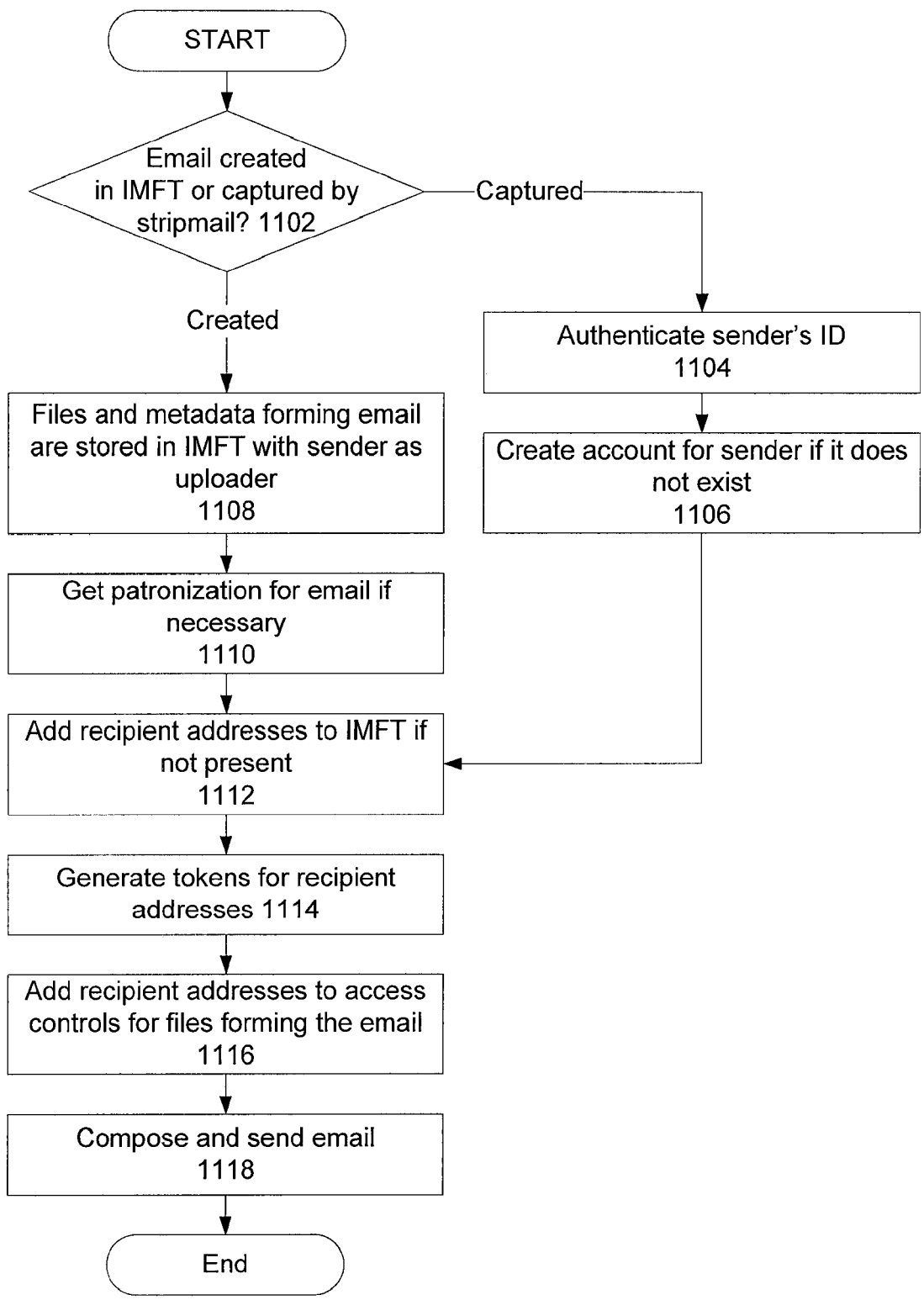
FIG. 11 is a flowchart of another embodiment of a method for processing email with the IMFT system and the attachment filter in accordance with the present invention.

Referring now to FIG. 11, an integrated method for processing email with the IMFT system 102 and the attachment filter 206 is described. The process begins by determining 1102 whether the email is being created using the IMFT system 102, or whether it is an email captured by the attachment filter 206.

If the IMFT system 102 is processing an email captured by the attachment filter 206, the method continues in step 1104 by authenticating the sender's ID. Since the email may be from a user outside the IMFT system 102, the sender must first be authenticated. Next, a user account is created for the sender if one does not already exist. Creation of an account happens automatically as has been described above by the IMFT system 102 when a previously unseen email address is authenticated. After step 1106, the method transitions to step 1112 and processing continues the same as if the message were created internal to the IMFT system 102.

If the email was being created using the IMFT system 102, the user already has established an account and been authenticated, so the method continues in step 1108 where the files and metadata forming an email are stored 1108 in the IMFT system 102 with the sender as the uploader. However, to ensure that only authorized person use the resources of the IMFT system 102, the email must get patronized if necessary. In step 1110, the IMFT system 102 determines whether patronization is necessary for this email. If patronization is necessary, the IMFT system 102 secures patronization and continues on to step 1112. If the message cannot be patronized, the email is not sent in the method ends. Patronization provides control over the use of server resources. In particular, one exemplary default is that if the sender or at least one recipient is authorized to use the IMFT system 102, the message does not need to be patronized. However, if the message is being sent from a sender that is not authorized to use the IMFT system 102 to at least one user that is not authorized to use the IMFT system 102, then use of the server resources for sending emails and hosting files must be patronized or sponsored by another person authorized to use the IMFT system 102. This rule ensures that outsiders cannot use the resources such as storage space and bandwidth unless they are communicating with an authorized user. The IMFT system 102 advantageously automatically generates messages and secures patronization by sending access control emails for approval by an authorized user. This process will be explained in more detail with reference to FIG. 12 below. Those skilled in the art will recognize that a variety of other patronization configurations may be applied by the system administrator. For example, patronization may only be required when server resources such as available storage space and bandwidth become scarce beyond a particular threshold.

In step 1112, the recipient addresses for the email are added to the IMFT system 102 if they do not already exist on the system. Next in step 1114, the IMFT system 102 generates a token for each recipient address that does not already exist on the system. These tokens can be used to provide the users corresponding to the addresses with access to files. In step 1116, the IMFT system 102 adds the recipient address to the access controls for the files that form the email. Finally in step 1118, the IMFT system 102 composes and sends the email. This process is similar to that which was described above with reference to FIGS. 9A and 9B.

Figure 12A:
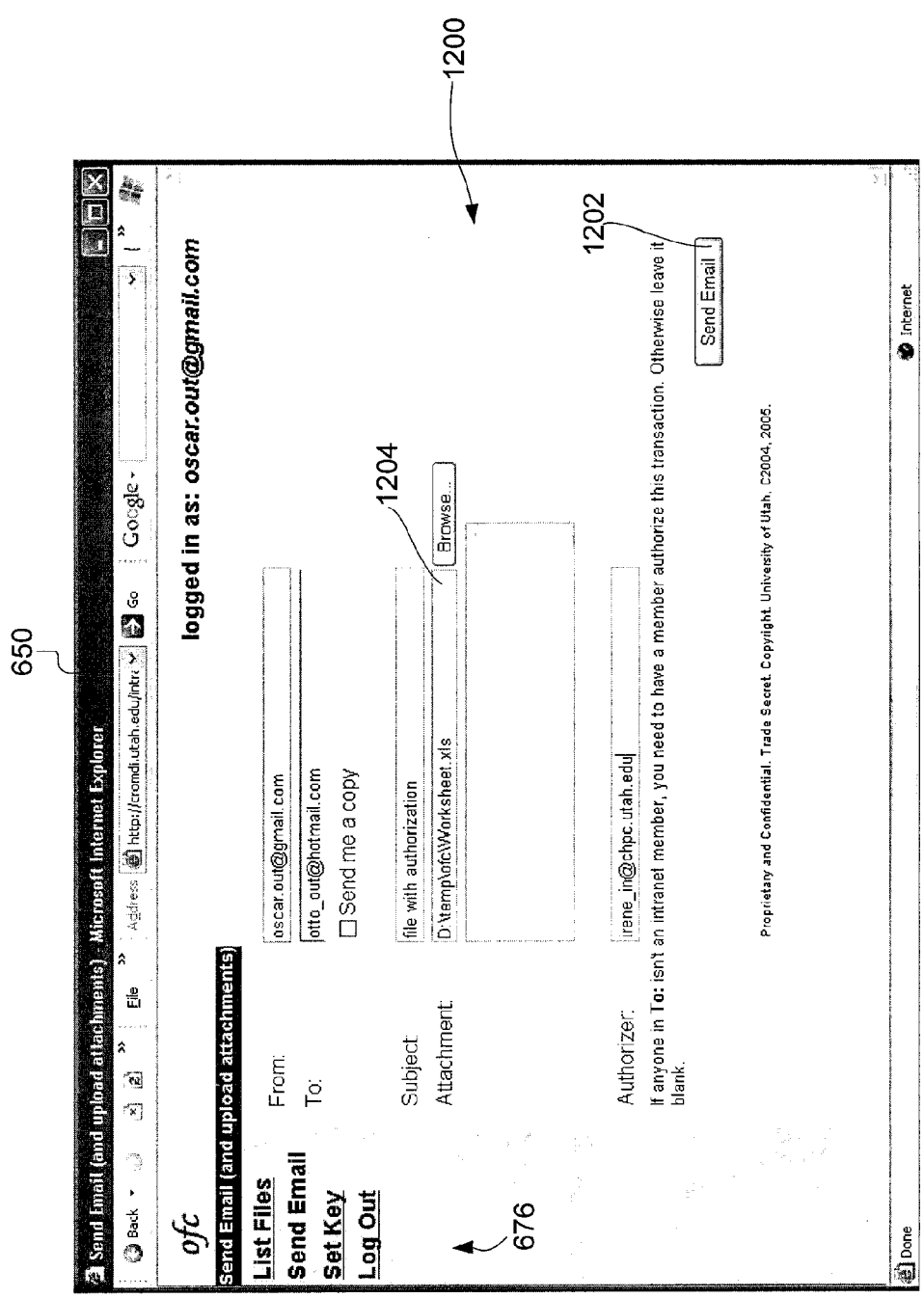
Figure 12C:
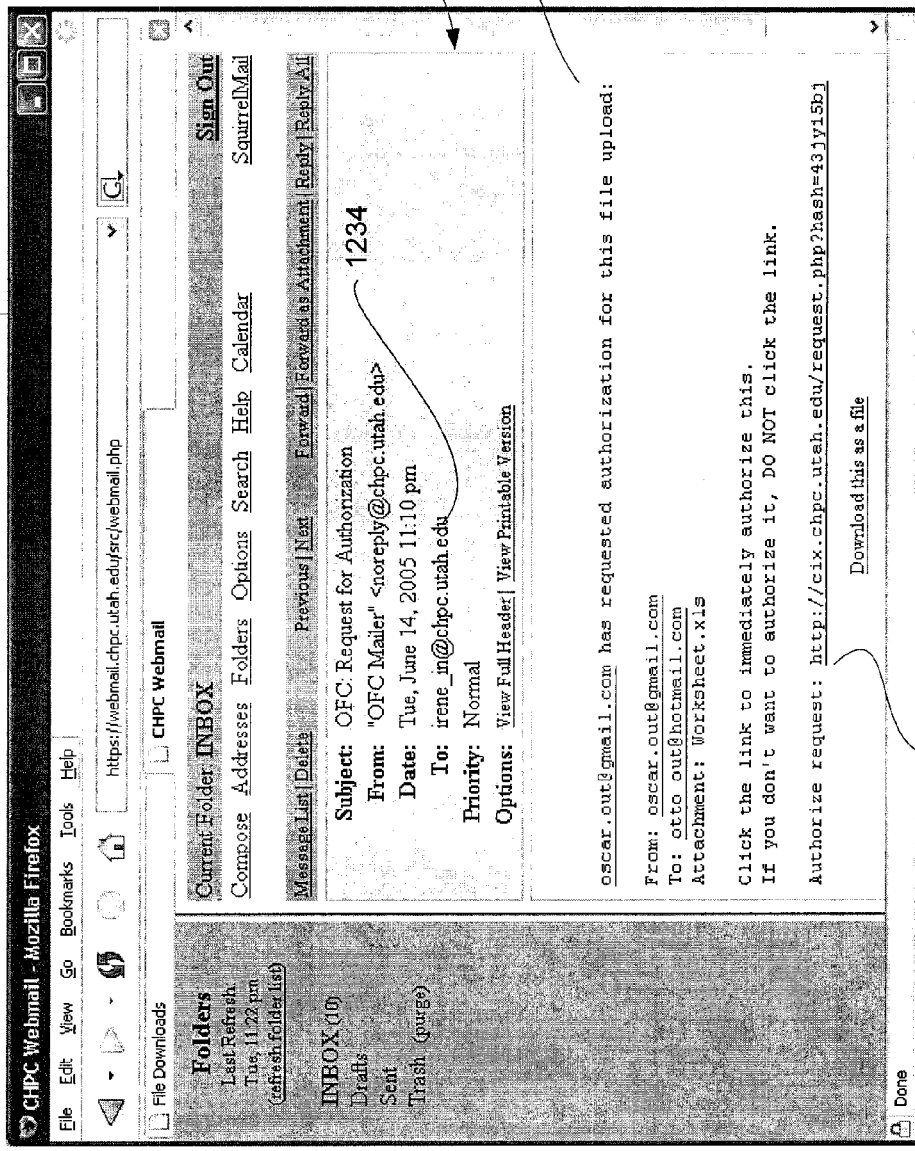
Figure 12D:
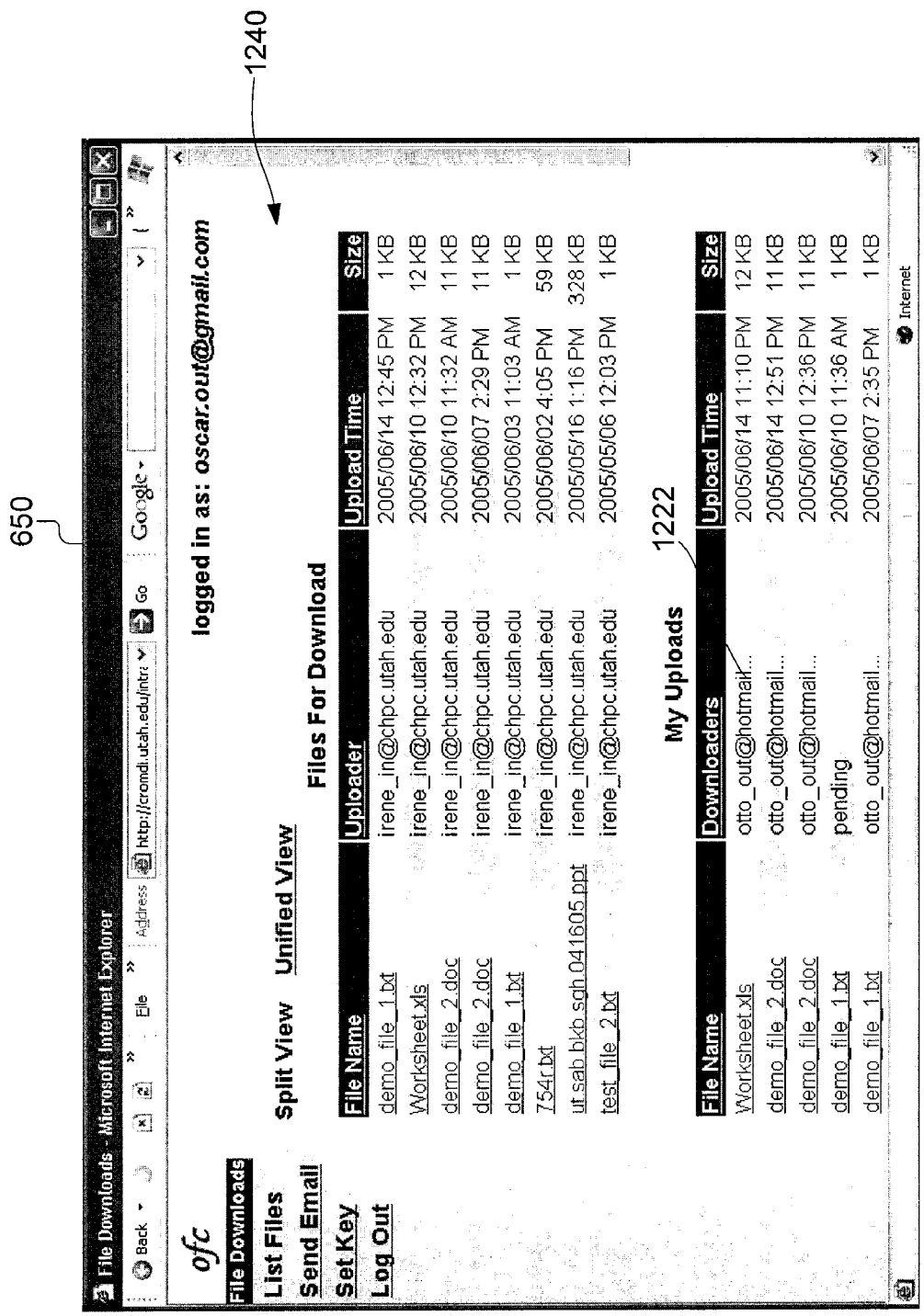
Figure 6E:
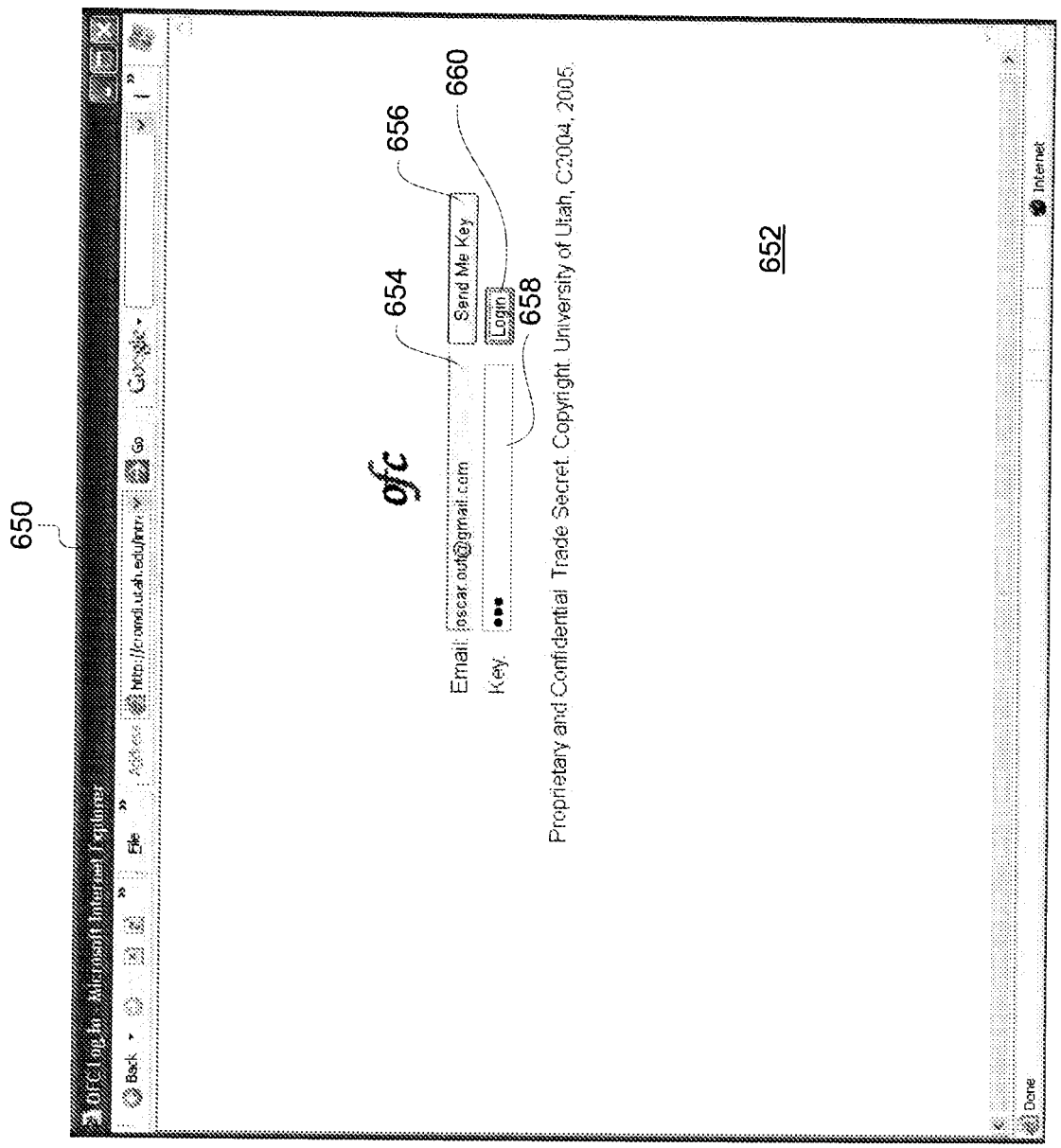

Referring now to FIGS. 12A-12D, the process described above will be explained in more detail. In particular, FIG. 12A shows a graphical representation of a web page 1200 generated by the IMFT system 102 adapted for integrated functions. The web page 1200 allows the user to select and add a file for uploading to the IMFT system 102, set the access control for the file, list email address that can access the file, send the email with a link to a file, and set an authorization for the email. This is the patronization component that allows an outsider of an organization to make a file available to another outsider. If an insider were either in the "From" or "To" fields, the patronization would not be needed, as the organization normally accepts outgoing or incoming file attachments included in the emails processed by the organizational email service. If this functionality was not implemented, anyone could send email to anyone, thus using organizational resources without control. However, there are many situations where outsider to outsider communication is acceptable and should be allowed. For example, consider two vendors working together to provide a company with services or goods. Once the "Send email" button 1202 is clicked on web page 1200, the file list of oscar_out has said file as "Pending:" 1222 in the Uploads part of the file list as shown by the main page 1220 of FIG. 12B. At the same time, an email 1232 is sent to the authorizer 1234, irene_in@chpc.utah.edu, who receives the email 1232 requesting her to authorize the transaction and providing a link 1236 as shown in web page 1230 of FIG. 12C. If and when, irene_in@chpc.utah.edu clicks the link 1236 to authorize, then the transaction is completed, and the file list as shown in the main page 1240 of FIG. 12D indicates the file as made available 1222 to otto_out@hotmail.com, while such recipient receives the email with the link.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX A

Integrated Mail and File Transfer Feature List

File access control list where the IDs are email addresses
Separation of file for upload, access and notification
Viewing & downloading files available to email address without account creation
Email address holder requests all files available to him
Track who downloaded file
Upload multiple versions
Expiring file link
Encrypted file up/download
Authentication by token
Expiring authentication link
Control access by email
Email link of uploaded file
Download w/o account
Shared file list w/o account
File upload patronization
Notify file recipient
Sender attaches file in email client, recipient has link to file
Recipient can pull attachment sent by email client, from IMFT system.
Authorization Expiration
Address book integration
File grouping/folders

What is claimed is:

1. A system for data transport and storage, the system comprising:
   a filter having an input and an output, the filter receiving a message including an attachment, the filter generating a content file from the attachment and a modified message that replaces the attachment with a link that corresponds to the content file, the filter also prescribing dictating at least a file type of the attachment to be replaced by a the link, a threshold size of a the attachment to be replaced by a the link, a size limit for the attachment, a user quota for file storage and a verbosity level of a log for monitoring operation of the system;
   a data storage coupled to the filter, the data storage persistently storing the content file,
   a control server having an input and an output, the control server for controlling the storage of files in the data storage and controlling access to the modified message, the control server coupled to the filter and the data storage, the control server further comprising:
      an access control module for dynamically setting access controls for the content file stored in the data storage, the access control module coupled for communication with the data storage and a user, and
      an account creation module for automatically creating new accounts and providing authentication of users in response to receipt by the control server of a unique identification from the user, the account creation module coupled for communication with the data storage and the user;
   wherein the modified message includes a message component that is replaced by a component link, the message component comprising any of a message body, an HTML formatted message's file component, an image that is linked in HTML content and a file that is linked in HTML content; and
   wherein the link corresponding to the message body further comprises a hash of a file name as part of the link.

2. The system of claim 1 further comprising a message server having an input and an output for sending and receiving the message, the message server coupled to the filter.

3. The system of claim 2 wherein the filter is an adapter for the message server.

4. The system of claim 1 further comprising a web server having an input and an output for sending web pages and files and receiving files and data, the web server coupled to the control server.

5. The system of claim 1 wherein the control server generates a file representing the message component using the content file and a metadata file.

6. The system of claim 1 wherein the filter generates a metadata file from the message, and wherein the data storage persistently stores the metadata file.

7. The system of claim 1 wherein the unique identification is one from the group of an email address, an instant messaging identification, a government issued identification, a Short Message Service number, a token, and a telephone number.

8. The system of claim 1, wherein for a file stored in the data storage, the access control module creates a list of unique identifications with access to the file.

9. The system of claim 1, wherein for a unique identification, the access control module creates a list of files accessible by the unique identification.

10. The system of claim 4, wherein the data received at the input of the web server comprises a list of accessible files stored in the data storage, and the web pages sent from the output of the web server modify the list of accessible files stored in the data storage.

11. The system of claim 1, wherein the access control module includes at least one type of permission for file access from the group of permission based on the unique identification, permission at the file level, inheritance of permission, and permission for a limited period of time.

12. The system of claim 1, wherein the message is encrypted.

13. The system of claim 12, wherein the unique identification includes a private key matching a public certificate of the control server.

14. The system of claim 6, wherein the metadata file further comprises at least one unique object identification, and at least one of a message identification from a message header, a sender, a recipient, a message date, a system timestamp, an object type, a content type, a file size, and a full pathname where the file will be stored.

15. The system of claim 14, wherein the object identification comprises a hash of data that uniquely identifies a message component, comprising at least one of the message header, the message date, the system timestamp, and a checksum.

16. The system of claim 14, wherein the object type comprises either a list of all object identifications of all attachments to the message or an object identification of which the object was an attachment and an original file name.

17. A method for data transport and storage, comprising the following steps:
   receiving, with a filter, a message including an attachment;
   filtering the message by removing the attachment from the message and prescribing a file type of the attachment to be replaced by a link, a threshold size of the attachment to be replaced by the link, a size limit for the attachment, a user quota for file storage and a verbosity level of a log for monitoring operation of the system;
   generating a content file from the attachment;
   storing the content file persistently in a data storage;
   sending the content file to a control server;

generating a modified message that replaces the attachment with a the link that corresponds to the content file; by creating a component link corresponding to a component file that includes a message component, the message component comprising any of a message body, an HTML formatted message's file component, an image that us linked in HTML content and a file that is linked in HTML content;

transmitting the modified message to a user;

setting access controls for the content file;

automatically creating new accounts and providing authentication in response to receipt by the control server of a unique identification from the user; and wherein the step of creating the link corresponding to the message body is performed using a hash of the file name as part of the link.

18. The method of claim 17, comprising sending from a message server the message received by the filter, the message server configured and enabled for sending and receiving messages.

19. The method of claim 18 wherein the filter is an adapter for the message server.

20. The method of claim 17 comprising sending web pages and files and receiving files and data from a web server coupled to the control server.

21. The method of claim 17 comprising generating with the control server a file representing the message component using the content file and a metadata file.

22. The method of claim 17 comprising generating with the filter a metadata file from the message, and storing the metadata file persistently in the data storage.

23. The method of claim 20, wherein the unique identification is one from the group of an email address, an instant messaging identification, a government issued identification, a Short Message Service number, a token, and a telephone number.

24. The method of claim 17, comprising selecting a file stored in the data storage and displaying a list of unique identifications with access to the file.

25. The method of claim 17, comprising displaying a list of files accessible by the unique identification.

26. The method of claim 20, comprising viewing files stored in the data storage with the received files and data from the web server, and modifying access to files stored in the data storage by sending web pages to the web server.

27. The method of claim 17, wherein setting access controls for a file stored in the data storage includes at least one type of permission from the group of permission based on the unique identification, permission at the file level, inheritance of permission, and permission for a limited period of time.

28. The method of claim 17, wherein the message is encrypted.

29. The method of claim 28, wherein the unique identification comprises a private key matching a public certificate of the control server.

30. The method of claim 22, wherein the step of generating the metadata file comprises creating a unique object identification and extracting from the message at least one of a message identification from a message header, a sender, a recipient, a message date, a system timestamp, an object type, a content type, a file size, and a full pathname where the file will be stored.

31. The method of claim 30, where the step of creating at least one unique object identification comprises combining a hash of data that uniquely identifies a message component, including at least one of the message header, the message date, the system timestamp, and a checksum.

32. The method of claim 30, wherein the step of extracting an object type comprises either listing all object identifications of all attachments to the message or combining an object identification of which the object was an attachment with an original file name.

* * * * *

UNITED STATES PATENT AND TRADEMARK OFFICE
CERTIFICATE OF CORRECTION

| | | |
|---|---|---|
| PATENT NO. | : 8,065,424 B2 | Page 1 of 2 |
| APPLICATION NO. | : 11/457410 | |
| DATED | : November 22, 2011 | |
| INVENTOR(S) | : Stefano Foresti et al. | |

It is certified that error appears in the above-identified patent and that said Letters Patent is hereby corrected as shown below:

In the Drawings:

Delete Figure 6E and replace with attached Figure 6E

Signed and Sealed this
Thirteenth Day of March, 2012

David J. Kappos
*Director of the United States Patent and Trademark Office*